United States Patent
Bolger et al.

(10) Patent No.: US 11,794,588 B2
(45) Date of Patent: Oct. 24, 2023

(54) FEEDFORWARD TORQUE LIMIT FOR ELECTRIFIED POWERTRAIN

(71) Applicant: Ford Global Technologies, LLC, Dearborn, MI (US)

(72) Inventors: Bryan Bolger, Canton, MI (US); Carol Okubo, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 17/167,977

(22) Filed: Feb. 4, 2021

(65) Prior Publication Data

US 2022/0242250 A1  Aug. 4, 2022

(51) Int. Cl.
 *B60L 15/20* (2006.01)
 *B60L 58/12* (2019.01)

(52) U.S. Cl.
 CPC ............. *B60L 15/20* (2013.01); *B60L 58/12* (2019.02); *B60L 2240/12* (2013.01)

(58) Field of Classification Search
 CPC ...... B60L 15/20; B60L 58/12; B60L 2240/12; B60L 2240/14; B60L 2240/421; B60L 2240/423; B60L 2240/545; B60L 2240/547; B60L 2240/549; B60L 2270/12; B60L 50/16; B60L 50/60; B60L 15/2072; B60L 2270/145; B60W 30/18009; B60W 40/00; B60W 40/105
 See application file for complete search history.

(56) References Cited

U.S. PATENT DOCUMENTS

| | | | |
|---|---|---|---|
| 6,604,595 B2 | 8/2003 | Sakakiyama | |
| 7,363,138 B2 | 4/2008 | Scelers et al. | |
| 7,860,567 B2 | 12/2010 | Belalcazar et al. | |
| 8,417,431 B2 | 4/2013 | Okubo et al. | |
| 8,712,616 B2 | 4/2014 | Treharne et al. | |
| 10,099,682 B1 | 10/2018 | Johri et al. | |
| 2002/0046892 A1 | 4/2002 | Sakakiyama | |
| 2005/0080547 A1 | 4/2005 | Scelers et al. | |
| 2021/0003107 A1* | 1/2021 | Byun | B60K 6/48 |

FOREIGN PATENT DOCUMENTS

JP    2006256605 A    9/2006

OTHER PUBLICATIONS

Machine Translation of JP-6809661-B2 (Year: 2021).*
Yoshimura, M. et al., "Driving Torque Control Method for Electric Vehicle with In-Wheel Motors," Electrical Engineering in Japan, vol. 181, No. 3, Translated from Denki Gakkai Ronbunshi, vol. 131-D, No. 5, May 2011, 10 pages.

* cited by examiner

*Primary Examiner* — Alan D Hutchinson
(74) *Attorney, Agent, or Firm* — David Kelley; McCoy Russell LLP

(57) ABSTRACT

Methods and systems are provided for limiting requested wheel torque during startup of a vehicle having an electrified powertrain. In one example, a method may include, responsive to a discharge power currently available being less than or equal to a threshold discharge power, operating the vehicle while requesting the wheel torque at a feedforward torque limit, the feedforward torque limit being based on the discharge power and a threshold vehicle speed. In this way, large shifts in wheel torque may be avoided upon startup of the vehicle, thereby reducing noise, vibration, and harshness at the electrified powertrain.

15 Claims, 7 Drawing Sheets

FEEDFORWARD TORQUE LIMIT FOR ELECTRIFIED POWERTRAIN

FIELD

The present description relates generally to methods and systems for determining a feedforward torque limit for mitigating powertrain oscillations, particularly in an electric vehicle or a hybrid electric vehicle.

BACKGROUND/SUMMARY

A vehicle, such as a hybrid electric vehicle operating in an all-electric mode or an electric vehicle (the latter also referred to herein as an all-electric vehicle), may include an electrified powertrain capable of supplying sufficient power to propel the vehicle. Specifically, the electrified powertrain may include a rechargeable battery or battery pack configured to power an electric motor. The electric motor, in turn, may supply wheel torque to one or more drive wheels of the vehicle (e.g., via a driveshaft), thereby propelling the vehicle. Because no engine is employed during operation of the electrified powertrain for sole power generation and delivery, the wheel torque supplied to the one or more drive wheels may be limited by operating conditions of the electric motor and the rechargeable battery.

In general, the wheel torque may be considered a ratio of power supplied to vehicle speed. Accordingly, when the vehicle speed is low (e.g., near zero, such as during vehicle startup), a large amount of wheel torque may be available even with a relatively small power input. As the vehicle speed increases, the rechargeable battery may not be conditioned to sustain substantially continuous high discharge power while fulfilling a request for the large amount of wheel torque, especially when a state of charge (SOC) and/or a temperature of the rechargeable battery are relatively low. Accordingly, discharge power throttling may be commanded at the rechargeable battery as the vehicle begins motion, resulting in significant powertrain oscillations (e.g., noticeable by an operator of the vehicle).

Previous attempts at limiting wheel torque include disturbance rejection control strategies. Example approaches are shown by Sakakiyama in U.S. Pat. No. 6,604,595 and Scelers et al. in U.S. Pat. No. 7,363,138, as well as by Yoshimura et al. in "Driving Torque Control Method for Electric Vehicle with In-Wheel Motors" (*Electr. Eng. in Japan*, 2012, 181, 49-58). Each of Sakakiyama, Scelers et al., and Yoshimura et al. teach reducing or redistributing wheel torque responsive to loss of traction (e.g., wheel slippage) after vehicle startup. Other attempts at mitigating powertrain oscillations include reducing regenerative brake torque, as in Treharne et al. (U.S. Pat. No. 8,712,616), or adjusting torque distribution among multiple power sources (e.g., in power-split configurations), as in Syed et al. (U.S. Pat. No. 7,860,567).

However, the inventors herein have recognized that such attempts fall short of managing powertrain oscillations during startup of an electrified (e.g., non-hybrid) powertrain. For instance, absent multiple power paths or outputs executable in series or in parallel, solutions which include redistributing the wheel torque have limited applicability. Further, by waiting for disturbances to occur during vehicle operation (e.g., post-startup), powertrain oscillations ascribed to unfavorable startup conditions (e.g., low battery SOC, low battery temperature, etc.) may be left unaccounted for.

In one example, the issues described above may be addressed by a method for operating a vehicle during startup, the method including, responsive to the discharge power currently available to a battery pack of the vehicle being less than or equal to a threshold discharge power and further responsive to a current vehicle speed being less than or equal to a threshold vehicle speed, operating the vehicle while requesting a wheel torque at a feedforward torque limit, the feedforward torque limit being based on the threshold vehicle speed and the discharge power currently available to the battery pack. In this way, a feedforward control strategy may be implemented to limit wheel torque upon vehicle startup such that powertrain oscillations resulting from drastic changes in torque delivery may be mitigated.

As one example, during vehicle startup, a wheel torque may be requested at a minimum of a maximum torque capability of a vehicle and a dynamically adjustable feedforward torque limit so as not to overwhelm an electrified powertrain of the vehicle. The maximum torque capability may be a set value, specific to given vehicle and battery configurations. The feedforward torque limit may depend upon an instantaneous discharge power limit of a battery of the vehicle at a calibratable minimum vehicle speed, such that an amount of wheel torque supplied may be effectively limited by the instantaneous discharge power limit. Additionally or alternatively, because an SOC of the battery may be a function of a discharge power of the battery and vice versa, the amount of wheel torque supplied may be considered limited based on whether or not the SOC is greater than a threshold SOC, the threshold SOC determined based on a preset threshold discharge power adjusted according to a temperature of the battery (e.g., the threshold SOC may be increased for temperatures below a peak performance range of the battery). Whether the maximum torque capability or the feedforward torque limit is selected to restrict the requested wheel torque, the wheel torque may continue to be dynamically limited throughout vehicle operation (e.g., even post-startup, regardless of the vehicle speed). In this way, the requested wheel torque may be dynamically reduced during select vehicle operating conditions such that the battery does not exceed the instantaneous discharge power limit thereof, thereby improving drivability by reducing noise, vibration, and harshness at a powertrain of the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
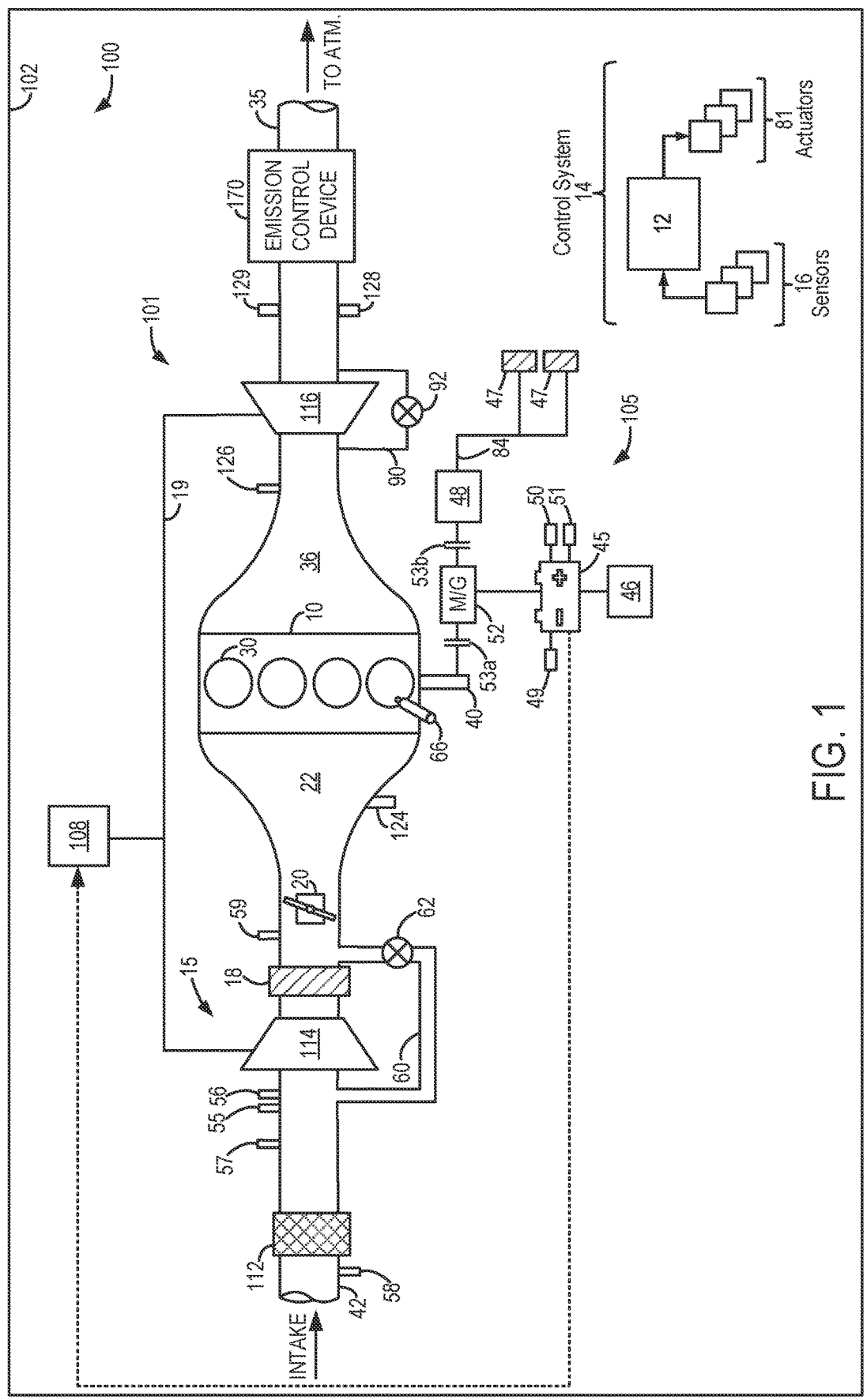
FIG. 1 shows a schematic diagram of an example embodiment of a vehicle configured with an electrified powertrain.
Figure 2:
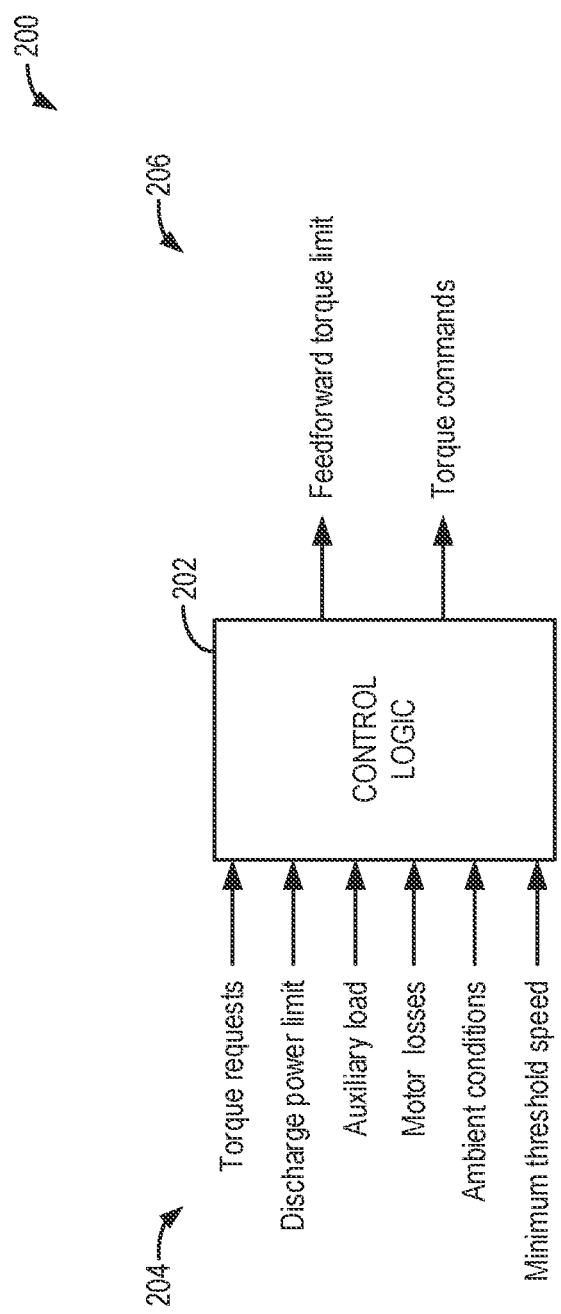
FIG. 2 shows a high-level input-output diagram for a vehicle controller operable to limit torque via a feedforward control loop during vehicle startup.
Figure 6:
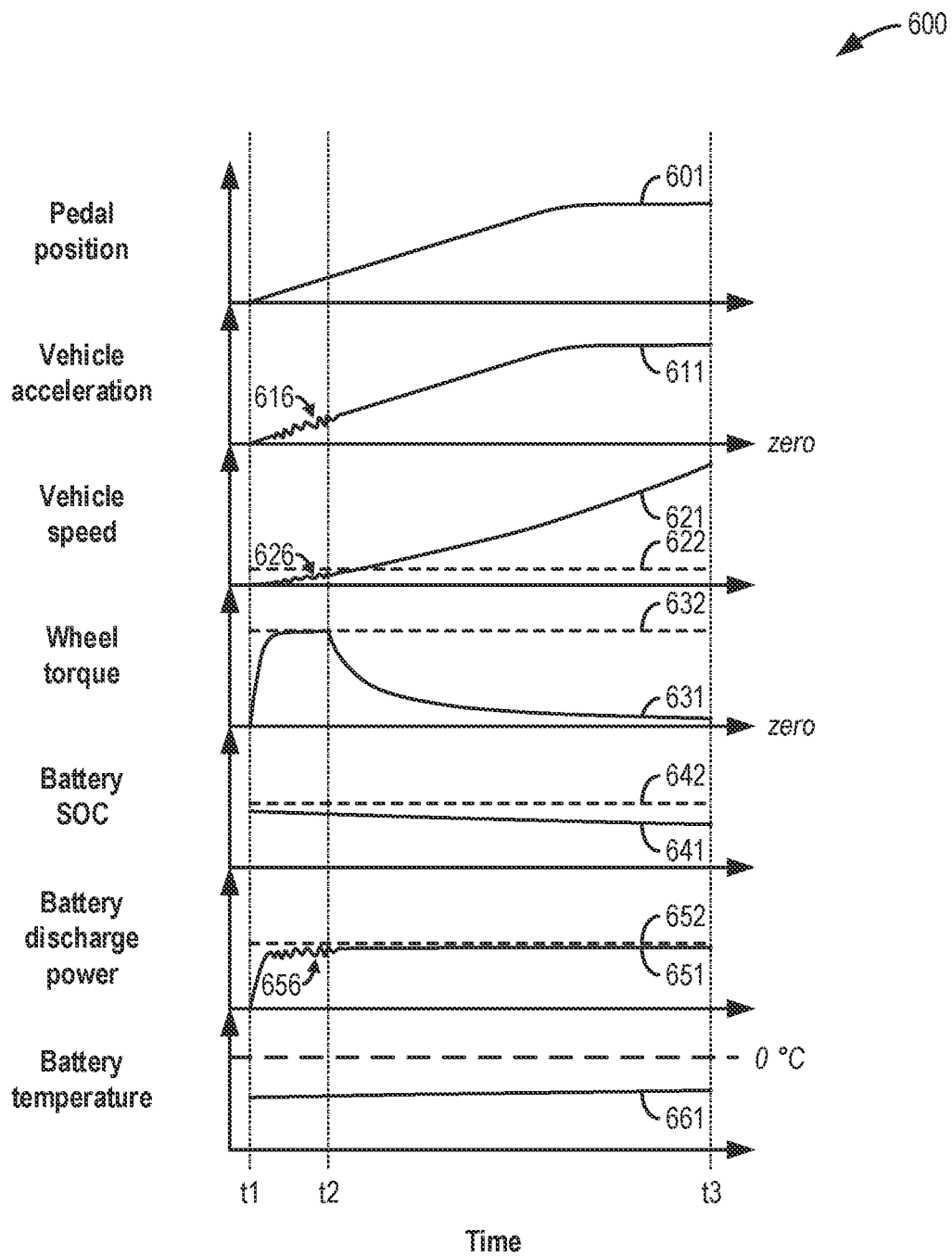
FIG. 6 shows a prophetic example of limiting wheel torque based on a maximum torque deliverable by a vehicle battery when a battery SOC is less than the threshold SOC upon vehicle startup.
Figure 7:
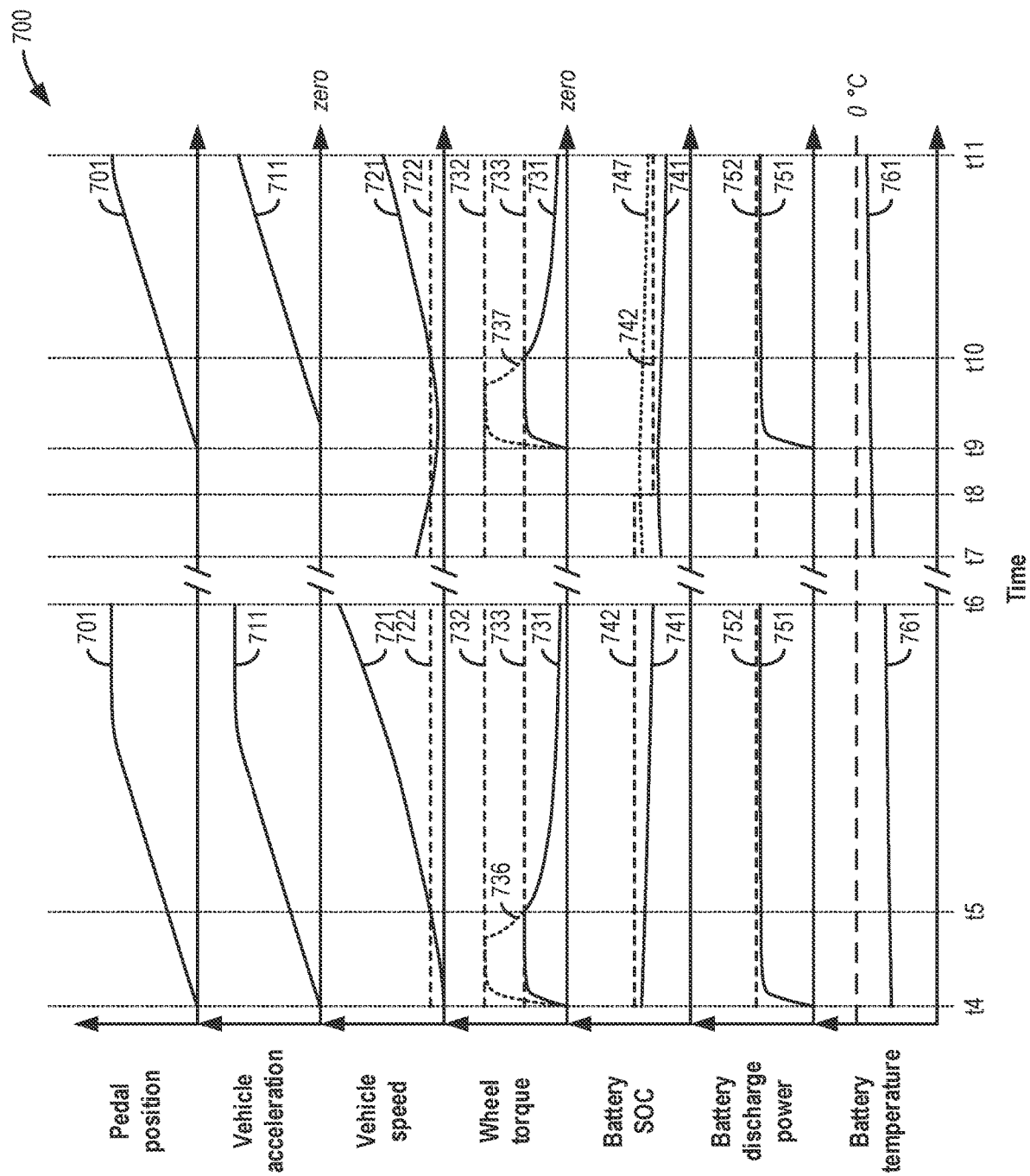
FIG. 7 shows a prophetic example of limiting wheel torque based on the feedforward control loop when the battery SOC is less than the threshold SOC upon vehicle startup.

The following description relates to methods and systems for determining a feedforward torque limit at vehicle startup to mitigate oscillations of an electrified powertrain, such as the electrified powertrain included in the vehicle system of FIG. 1. A feedforward control routine for determining the feedforward torque limit and restricting a requested wheel torque therewith may be implemented at a controller included in the vehicle system, the controller configured to process one or more inputs to generate one or more outputs, as shown at FIG. 2. For example, the control routine may include the method depicted at FIG. 3 for dynamically mitigating oscillations of the electrified powertrain. Therein, the control routine may include determining the feedforward torque limit as a ratio of an instantaneous discharge power limit to a minimum threshold vehicle speed whenever a state of charge (SOC) of a battery of the vehicle system is less than a threshold SOC and a vehicle speed of the vehicle system is less than or equal to the minimum threshold vehicle speed. In some examples, the control routine may include looking up the threshold SOC based on each of a threshold discharge power and a temperature of the battery, such as by using the map depicted at FIG. 4. In some examples, the control routine may include looking up the feedforward torque limit based on each of the instantaneous discharge power limit and the minimum threshold vehicle speed, such as by using the map depicted at FIG. 5. FIGS. 6 and 7 each depict a prophetic example of operation of the vehicle system with the battery at a low SOC and the wheel torque limited based on either a maximum torque capability of the vehicle system (in FIG. 6) or the feedforward torque limit (in FIG. 7).

Referring now to FIG. 1, aspects of an example vehicle system 100 including an electrified powertrain 105 are depicted schematically. In the example shown, electrified powertrain 105 may include an electric machine 52 which may be a motor or a motor/generator. In some examples, the vehicle system 100 may be a hybrid vehicle system, further including an engine system 101 having an engine 10 coupled to a vehicle 102 and included with electrified powertrain 105 in a hybrid powertrain configuration. Accordingly, in such examples, vehicle 102 may be a hybrid electric vehicle with multiple sources of torque available to one or more vehicle (drive) wheels 47. Engine 10 and electric machine 52 may be connected to vehicle wheels 47 via a transmission 48 when one or more clutches 53 are engaged. In the depicted example, a first clutch 53a is arranged between engine 10 and electric machine 52 and a second clutch 53b is arranged between electric machine 52 and transmission 48. A controller 12 may send a signal to an actuator of each respective clutch 53a, 53b to engage or disengage the respective clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53a, 53b are engaged. Transmission 48 may be a gearbox, a planetary gear system, or another type of transmission. Transmission 48 may be a fixed ratio transmission that includes a plurality of gear ratios to allow engine 10 to rotate at a different speed than vehicle wheels 47. By changing a torque transfer capacity of first clutch 53a (e.g., an amount of clutch slippage), an amount of engine torque relayed to the vehicle wheels 47 via powertrain shaft 84 may be modulated.

Electrified powertrain 105 may be configured in various manners, including as part of a hybrid powertrain in a parallel, a series, or a series-parallel hybrid vehicle. In one such embodiment, electric machine 52 may be a hybrid electric vehicle motor coupled in the hybrid powertrain between engine 10 and transmission 48. In other examples, electric machine 52 may be a crankshaft integrated starter/generator (CISG). The CISG may be coupled to an output shaft of engine 10 so that during a startup of vehicle system 100, the CISG may provide torque to turn engine 10 and thereby facilitate startup of engine 10. Under some conditions, the CISG may supply torque output to supplement or replace engine torque. Further, the CISG may supply negative torque output (that is, absorb driveline torque) that may be converted into electric energy, such as for charging a system electrical energy storage device 45, or system battery 45. It will be appreciated that while the system electrical energy storage device 45 is depicted herein as a rechargeable battery or battery pack, in other examples, the system electrical energy storage device 45 may be a capacitor.

In all-electric vehicle embodiments (e.g., having no engine system 101), electrified powertrain 105 may include system battery 45 (e.g., a traction battery) delivering electrical power to electric machine 52 to provide torque to vehicle wheels 47. In some embodiments, electric machine 52 may also be operated as a generator to provide electrical power to charge system battery 45, for example, during a braking operation. In other embodiments, electric machine 52 may be operated as a generator during vehicle cold starts (as used herein, vehicle cold starts may include vehicle startup when vehicle system 100 has substantially cooled from previous operation and/or vehicle startup during cold ambient conditions). During such an event, one or more exhaust after-treatment components included in an emission control device 170 (described in further detail below) may not yet be sufficiently heated to achieve light-off. To speed up this light-off, an intake mass air flow may be increased, which may correspondingly increase engine load and thereby exhaust gas temperature. The increased engine load may be mechanically transferred to electric machine 52 to power electric machine 52 as a generator. A resulting electric load, or current, generated by electric machine 52 may then be used to charge system battery 45.

In certain circumstances, system battery 45 may have a relatively low SOC. Further, in cold ambient conditions (e.g., upon vehicle cold start), system battery 45 may not operate at peak performance. Under such conditions, a discharge power of system battery 45 may be limited to a relatively low value. Upon subsequently receiving a vehicle startup request, e.g., autonomously or from an operator of vehicle system 100, powertrain performance may be limited based on the low discharge power (e.g., limited based on the low SOC and the cold ambient conditions).

Specifically, during vehicle startup, high wheel torque may initially be available at near-zero vehicle speeds regardless of an amount of power that system battery 45 is able to supply to electric machine 52 (the wheel torque being defined as a ratio of power supplied to the vehicle speed during vehicle motion, such that the wheel torque increases as the vehicle speed decreases towards zero and/or the power supplied increases, whereas the wheel torque decreases as the vehicle speed increases and/or the power supplied decreases). However, the available wheel torque may rapidly fall as the vehicle speed increases (e.g., when low discharge power is available), resulting in physical oscillations of electrified powertrain 105 and thereby increasing noise, vibration, and harshness (NVH) issues.

In embodiments described herein, such drastic changes in the wheel torque may be mitigated by dynamically limiting the wheel torque for an entire duration of vehicle operation (e.g., from vehicle startup to vehicle shutdown). Specifically, and as discussed below, for a predetermined range of relatively low vehicle speeds (e.g., wherein large wheel torque changes may prove most problematic), requested wheel torque may be sustained at a wheel torque available at the high end of the set range (regardless of the wheel torque actually available upon startup). When the vehicle speed surpasses the high end of the set range, only then may the wheel torque begin dropping with increasing vehicle speed. In this way, relatively severe shifts in the wheel torque may be avoided, thereby mitigating oscillations in electrified powertrain 105.

In additional or alternative embodiments, system battery 45 may power one or more electrical systems of engine 10, such as one or more auxiliary systems including a heating, ventilation, and air conditioning (HVAC) system, vehicle lights, an on-board entertainment system, and other auxiliary systems based on their corresponding electrical demands. In one example, a current drawn on system battery 45 may continually vary based on one or more of an operator cabin cooling demand, a battery charging requirement, other auxiliary vehicle system demands, and motor torque.

One or more sensors may be coupled to system battery 45. The one or more sensors may be configured to generate feedback indicative of one or more operating conditions of system battery 45. For example, a battery temperature sensor 49 may be coupled to system battery 45 for estimating a battery temperature. As an another example, a voltmeter 50 may be coupled to system battery 45 for estimating a potential difference across system battery 45. As yet another example, an ammeter 51 may be coupled to system battery 45 for estimating a battery current. In one example, the SOC and/or an instantaneous discharge power limit of system battery 45 may be estimated based on the received feedback. For instance, the SOC of system battery 45 may be determined based on integration of the battery current (e.g., based on the feedback from ammeter 51 and, in some examples, corrected by a determined open circuit voltage), and the instantaneous discharge power limit may be determined as a function of the SOC and the battery temperature, and, in some examples, an instantaneous cell voltage (e.g., based on the feedback received from voltmeter 50). Though some embodiments described herein may include each of battery temperature sensor 49, voltmeter 50, and ammeter 51, other embodiments may include fewer sensors or no sensors coupled to system battery 45. In such other embodiments, at least one of the one or more operating conditions of system battery 45 may be determined indirectly. For example, the battery temperature may be inferred (e.g., extrapolated) based on an ambient temperature of a surrounding environment [e.g., as estimated based on feedback generated by an external temperature sensor (not shown)] and a location of system battery 45 relative to the surrounding environment. As another example, the one or more operating conditions may be determined by providing inputs to one or more look-up tables, functions, or maps stored in non-transitory memory of controller 12.

In some embodiments, system battery 45 may be coupled to a battery heater 46. Battery heater 46 may be powered at least in part via an external power source (e.g., prior to vehicle startup). Accordingly, the battery temperature may be increased relative to the ambient temperature of the surrounding environment via operation of battery heater 46. Additionally or alternatively, system battery 45 may be provided with an insulating sleeve to retain heat at system battery 45 (e.g., from prior vehicle operation or from previously warmer ambient temperatures).

In the depicted embodiment, engine 10 is a boosted engine configured with a turbocharger 15. Turbocharger 15 may include a compressor 114 that is mechanically coupled to, and driven by, a turbine 116 via a turbocharger shaft 19, turbine 116 being driven in turn by expanding engine exhaust. In one embodiment, turbocharger 15 may be a twin scroll device. In another embodiment, turbocharger 15 may be a variable geometry turbocharger (VGT), or variable nozzle turbine (VNT), wherein turbine geometry may be actively varied as a function of engine operating conditions.

Rotation of turbine 116, driven by exhaust gas, may compel rotation of compressor 114. Fresh air may be introduced along an intake passage 42 into engine 10 via air box 112 and may flow therefrom to compressor 114. During select conditions, air compressed by turbocharger 15 may also be recirculated from an outlet to an inlet of compressor 114 through a compressor recirculation passage 60 by adjusting an opening of a compressor recirculation valve (CRV) 62. CRV 62 may be a continuously variable valve, or possibly a variable discrete valve, and increasing the opening of CRV 62 may include actuating (or energizing) a solenoid of CRV 62 if discrete, or a motor controller such as a H bridge if continuous. In some embodiments, CRV 62 may be partially open during boosted engine operation to provide a surge margin. Herein, the partially open position may be a default valve position. Then, in response to an indication of surge, the opening of CRV 62 may be increased. For example, CRV 62 may be adjusted from the default, partially open position toward a fully open position, with a degree of opening based on the indication of surge (e.g., a compressor ratio, a compressor flow rate, a pressure differential across the compressor, etc.). In alternate examples, CRV 62 may be held closed during boosted engine operation (e.g., peak performance conditions) to decrease boost response time and increase peak performance.

Compressor 114 may be coupled to a throttle valve 20 (also referred to as an intake throttle 20 herein) through a charge-air cooler (CAC) 18 (also referred to as an intercooler 18 herein). Air compressed by compressor 114 may sequentially flow through CAC 18 and throttle valve 20 to an intake manifold 22. CAC 18 may be an air-to-air or water-to-air heat exchanger, for example. Accordingly, air passing through CAC 18 may be cooled and a density of the air may be increased before flowing to intake manifold 22. Intake manifold pressure (e.g., a pressure of an air charge within intake manifold 22) may be determined using a manifold absolute pressure (MAP) sensor 124.

Intake manifold 22 may be coupled to a series of combustion chambers 30 through a series of intake valves (not shown). Combustion chambers 30 may further be coupled to an exhaust manifold 36 via a series of exhaust valves (not shown). In the depicted embodiment, a single exhaust manifold 36 is shown. However, in other embodiments, exhaust manifold 36 may include a plurality of exhaust manifold sections or banks. Configurations having a plurality of exhaust manifold sections may enable effluent from different combustion chambers 30 to be directed to different locations in engine system 101. Likewise, configurations wherein intake manifold 22 includes a plurality of intake manifold sections may enable air sourced from different locations to be directed to different combustion chambers 30 of engine system 101 (usually cylinder banks). Further, intake manifold 22 may have multiple intake throttles 20 (such as one per bank).

In one embodiment, each of the exhaust and intake valves may be electronically actuated or controlled (e.g., via control system 14). In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, a cam timing may be adjusted via a variable cam timing system to move the intake and exhaust cams to a position that provides an optimal volumetric efficiency for given operating conditions.

In some embodiments, engine 10 may also be configured for selective cylinder deactivation, wherein individual cylinder valve operation may be selectively deactivated via individual cylinder valve mechanisms (including intake and exhaust valve cams), and individual cylinder fueling may be selectively deactivated via deactivatable fuel injectors.

Combustion chambers 30 may be supplied one or more fuels, such as gasoline, alcohol fuel blends, diesel, biodiesel, compressed natural gas, etc. Fuel may be supplied to combustion chambers 30 via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber 30 may include a fuel injector coupled thereto). In other examples, fuel injector 66 may be coupled to an intake port, upstream of an intake valve, to provide fuel via port injection. Further still, fuel may be provided to a given combustion chamber 30 via multiple fuel injectors including multiple direct injectors, multiple port injectors, or a combination thereof. Fuel may be delivered to fuel injector 66 by a fuel system (not shown) including a fuel tank, a fuel pump, and a fuel rail. In combustion chambers 30, combustion may be initiated via spark ignition and/or compression ignition.

As shown in FIG. 1, exhaust from exhaust manifold 36 may be directed to turbine 116 to drive turbine 116. When reduced turbine torque is desired, a portion of exhaust may be directed instead through a turbine bypass 90 (e.g., a wastegate), bypassing turbine 116. A turbine bypass actuator 92 (e.g., a turbine bypass valve) may be actuated open to relieve at least some exhaust pressure from upstream of turbine 116 to a location downstream of turbine 116 via turbine bypass 90. By reducing exhaust pressure upstream of turbine 116, turbine speed may be reduced. When increased boost pressure is demanded, compressor 114 may be spooled up by spooling up turbine 116. Therein, more turbine torque may be provided by directing a larger portion of exhaust to be directed through turbine 116, and not through turbine bypass 90. Turbine bypass actuator 92 may be actuated closed to increase the exhaust pressure upstream of turbine 116. By increasing the exhaust pressure upstream of turbine 116, turbine speed may be increased.

A combined flow from turbine 116 and turbine bypass 90 may flow through emission control device 170. In general, emission control device 170 may include one or more exhaust after-treatment components configured to reduce an amount of one or more substances in the exhaust flow. For example, one exhaust after-treatment component may be configured to trap nitrogen oxides ($NO_x$) from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, emission control device 170 may further include a regeneratable soot filter configured to trap and oxidize soot particles in the exhaust flow.

All or part of the treated exhaust from emission control device 170 may be released into the atmosphere via an exhaust conduit 35 (also referred to as a tailpipe 35 herein). Depending on operating conditions, however, some exhaust may be diverted instead to intake passage 42 via an exhaust gas recirculation (EGR) passage (not shown), including an EGR cooler and an EGR valve. Exhaust may be recirculated to the inlet of compressor 114. Exhaust may be recirculated to intake manifold 22 nominally with EGR flow enabled only when the intake manifold pressure is less than an exhaust manifold pressure. At high load conditions, such as when engine 10 operates boosted and with a higher manifold pressure, EGR flow may be disabled. As such, it may not be efficient to flow EGR in high load conditions.

One or more sensors may be coupled to the inlet of compressor 114. For example, a temperature sensor 55 may be coupled to the inlet of compressor 114 for estimating a compressor inlet temperature. As another example, a pressure sensor 56 may be coupled to the inlet of compressor 114 for estimating a pressure of air entering compressor 114. Still other sensors (not shown) may include, for example, air-fuel ratio sensors, humidity sensors, etc. In other examples, one or more compressor inlet conditions (such as humidity, temperature, etc.) may be inferred based on engine operating conditions. The sensors may estimate a condition of intake air received at the compressor inlet from intake passage 42 as well as air charge recirculated from upstream of CAC 18. One or more sensors may also be coupled to intake passage 42 upstream of compressor 114 for determining a composition and condition of air charge entering compressor 114. These sensors may include, for example, a barometric pressure sensor 58. In addition, a throttle inlet pressure (TIP) sensor 59 may be coupled downstream of CAC 18 and upstream of throttle valve 20 for estimating or measuring a boost pressure delivered to engine 10.

During an operator tip-out event, when going from engine operation with boost to engine operation without boost (or reduced boost), compressor surge may occur. This may be due to a reduced forward flow through compressor 114 when throttle valve 20 closes at tip-out. The reduced forward flow through compressor 114 may cause surge and degrade turbocharger performance. In addition, surge may lead to NVH issues such as undesirable noise from the engine intake system. To enable a torque demand to be rapidly reduced responsive to the tip-out without incurring compressor surge during a default mode of vehicle operation, at least a portion of air charge compressed by compressor 114 may be recirculated to the compressor inlet. This may increase a compressor flow rate to move operation away from a surge region. In particular, CRV 62 may be opened to recirculate (warm) compressed air from the outlet of compressor 114, downstream of CAC 18, to the inlet of compressor 114. In some embodiments, the compressor recirculation system may additionally or alternatively include a recirculation passage for recirculating cooled compressed air from downstream of CAC 18 to the inlet of compressor 114. In addition, turbine bypass actuator 92 may be moved to a more open (e.g., fully open) position so that more of the exhaust flow travels to tailpipe 35 while bypassing turbine 116, thereby expediting turbine spin-down. Further still, turbocharger 15 may be electrically assisted by receiving negative torque from electric motor 108. Therein, electric motor 108 may remove torque from turbocharger shaft 19 connecting turbine 116 to compressor 114, while charging system battery 45.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 (which may be a temperature or pressure sensor) located upstream of turbine 116, MAP sensor 124, an exhaust temperature sensor 128 located downstream of turbine 116, an exhaust pressure sensor 129 located downstream of turbine 116, compressor inlet temperature sensor 55, compressor inlet pressure sensor 56, a mass air flow (MAF) sensor 57, barometric pressure sensor 58, TIP sensor 59, battery temperature sensor 49, voltmeter 50, and ammeter 51. Other sensors, such as additional pressure, temperature, air/fuel ratio, and composition sensors, may be coupled to various locations in vehicle system 100 within the scope of this disclosure. Actuators 81 may include, for example, electric machine 52, throttle valve 20, CRV 62, electric motor 108, turbine bypass actuator 92, and fuel injector 66. Controller 12 may receive input data from the various sensors, process the input data, and employ the various actuators to adjust engine operation based on the received signals and instructions stored on non-transitory memory of controller 12. The controller may employ actuators 81 in response to the processed input data based on instructions or code programmed therein corresponding to one or more routines, such as the example control routine described herein with reference to FIG. 3. As an example, and described below with reference to FIG. 2, controller 12 may pass a plurality of inputs (e.g., vehicle operating conditions) through a logic subsystem to output parameters (e.g., torque commands and limits) used by the example control routine of FIG. 3. The example control routine may further include instructing controller 12 to employ actuators 81 to control electric machine 52 to provide wheel torque to vehicle wheels 47, where the provided wheel torque may be limited according to a feedforward control loop receiving the instantaneous discharge power limit of system battery 45 and a minimum threshold vehicle speed as inputs. Specifically, electric machine 52 may be commanded to provide the wheel torque at less than a feedforward torque limit for a duration of vehicle operation, the feedforward torque limit corresponding to an available wheel torque at the minimum threshold vehicle speed (the available wheel torque at the minimum threshold vehicle speed in turn being limited by the instantaneous discharge power limit). In this way, large spikes in the wheel torque which may otherwise occur prior to the minimum threshold vehicle speed may be obviated, thereby reducing NVH issues stemming from such spikes.

Referring now to FIG. 2, a high-level diagram 200 of an input-output scheme for a logic subsystem of a vehicle controller, such as controller 12 of FIG. 1, is depicted. Further components described with reference to high-level diagram 200 may be embodiments of corresponding components of vehicle system 100 of FIG. 1. In one embodiment, the vehicle controller may be operable, via one or more control routines, to limit commanded wheel torque upon vehicle startup. As such, the vehicle controller may implement control logic 202 as machine-readable instructions in non-transitory memory of the logic subsystem, control logic 202 being executable to generate wheel torque commands and limits therefor.

At a higher level, control logic 202 may be operable to receive and process one or more inputs 204 and produce one or more outputs 206 according to (processed) inputs 204. Specifically, inputs 204 may include one or more vehicle operating conditions used to determine a current state of vehicle operation (e.g., at a vehicle cold start). In some examples, inputs 204 may include one or more torque requests generated responsive to operator demand (e.g., depression of an accelerator pedal). The one or more torque requests may include requests for a motor torque and the wheel torque, in addition to an engine torque in some examples (e.g., in hybrid powertrain configurations).

In determining actual torque delivered, further inputs 204 may be provided which may be used by control logic 202 to adjust and limit requested torque. For example, inputs 204 may include an instantaneous discharge power limit of a vehicle battery (e.g., system battery 45 of FIG. 1). The instantaneous discharge power limit may be used by control logic 202 to select a curve of the wheel torque as a function of a vehicle speed (e.g., as a contour of a three-dimensional space). Inputs 204 may further include a (calibratable) minimum threshold vehicle speed. Specifically, and as discussed in detail below, the minimum threshold vehicle speed may be used by control logic 202 to determine a feedforward torque limit along the selected curve.

Other vehicle conditions which may limit available torque may be included in inputs 204, such as an auxiliary load (e.g., vehicle cabin heating and cooling, cabin lighting, driver assistance systems, etc.), motor losses, and/or one or more ambient conditions of a surrounding environment. The auxiliary load may divert at least some power deliverable via the electrified powertrain away from vehicle propulsion, while the one or more ambient conditions may limit operating conditions of one or more components of the electrified powertrain (such as the battery). The motor losses may be specific to a configuration of a motor of the electrified powertrain and may result in lower motor efficiency than a theoretical maximum efficiency. In some examples, the one or more ambient conditions may include one or more of a pressure, a humidity, and a temperature of the surrounding environment and/or an altitude at which the vehicle is operating. In one example, inputs 204 may additionally include a temperature of the battery, the temperature of the battery being dependent upon the one or more ambient conditions and a relative location of the battery in the vehicle (e.g., the battery may be located adjacent to an outer surface of the vehicle and thereby the temperature of the battery may be more influenced by the one or more ambient conditions, or one or more components, such as an insulating sleeve, may be interposed between the battery and the surrounding environment, such that the battery may be less influenced by the one or more ambient conditions). The battery may further be coupled to a battery heater (e.g., battery heater 46 of FIG. 1), which may provide additional heat to the battery relative to that available in the surrounding environment.

Inputs 204, once received by control logic 202, may be processed thereat to generate outputs 206, each of which may be a function of at least one input 204. Outputs 206, for example, may include torque commands based on the (operator-provided) torque requests adjusted and limited according to the one or more vehicle operating conditions. As such, in certain circumstances, less torque (e.g., the motor torque, the wheel torque, the engine torque, etc.) may be commanded than requested.

For example, when the battery has a relatively low temperature and/or a relatively low SOC (the SOC of the battery being determined by control logic 202 based on each of the instantaneous discharge power limit and the temperature of the battery in some examples, or being received as an additional input 204 in other examples), the instantaneous discharge power limit may also be relatively low and the curve of the wheel torque corresponding thereto may indicate an accordingly lower available wheel torque. Further, as the curve of the wheel torque may be inversely dependent on the vehicle speed, available wheel torque may drop at a faster rate at a given vehicle speed at the relatively low instantaneous discharge power limit relative to higher instantaneous discharge power limits. To avoid spikes resulting from such rapid drops, the instantaneous discharge power limit, in combination with the minimum threshold vehicle speed, may be used by control logic 202 to determine the feedforward torque limit for limiting the wheel torque relative to the curve selected based on the instantaneous discharge power limit. Specifically, the feedforward torque limit may be defined as a ratio of the instantaneous discharge power limit to the minimum threshold vehicle speed. The feedforward torque limit may therefore be a point along the curve of the wheel torque selected based on the instantaneous discharge power limit. Due to the inverse dependence of the curve of the wheel torque on the vehicle speed, wheel torque values along the curve may only be higher than the feedforward torque limit at vehicle speeds less than the minimum threshold vehicle speed. Accordingly, in examples wherein commanded wheel torque is limited to the feedforward torque limit for a duration of vehicle operation, the wheel torque may be commanded at the feedforward torque limit up until the vehicle speed reaches the minimum threshold vehicle speed, after which the wheel torque may drop to less than the feedforward torque limit according to the curve as the vehicle speed increases. In this way, the wheel torque may be commanded less than the requested wheel torque at least up until the minimum threshold vehicle speed, such that oscillations of the electrified powertrain ascribed to drastic changes in magnitude of delivered wheel torque at relatively low vehicle speeds may be mitigated.

Figure 3:
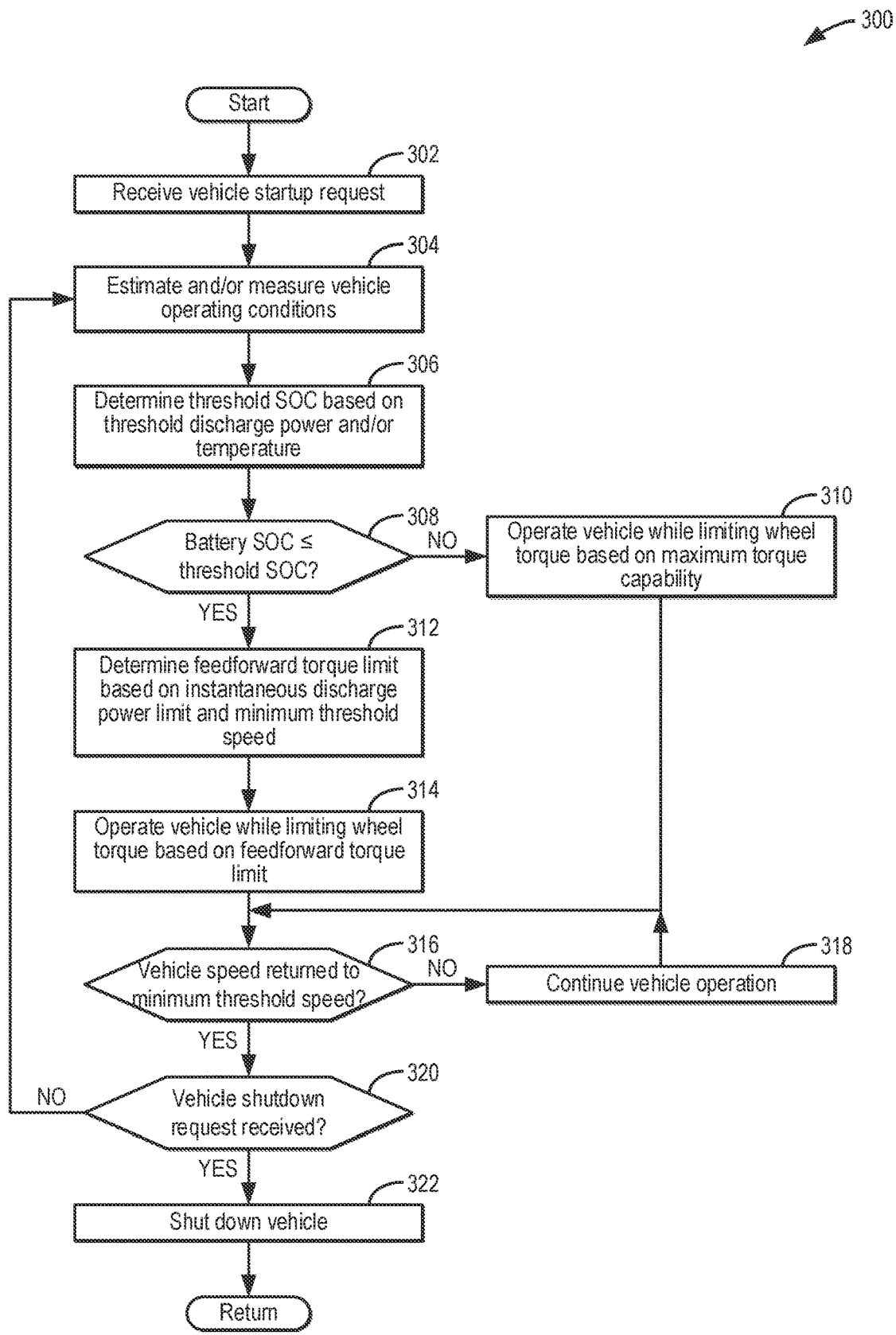
FIG. 3 shows a flow chart of a method for mitigating oscillations in an electrified powertrain, such as the electrified powertrain of FIG. 1.

Referring now to FIG. 3, a flow chart of an example routine 300 for limiting a wheel torque deliverable by an electric motor, thereby mitigating oscillations of an electrified powertrain including the electric motor, is shown. In some examples, the electrified powertrain may be included in a vehicle system configured for an all-electric startup, such as electrified powertrain 105 in vehicle system 100 as described in detail above with reference to FIG. 1. As such, in some examples, the vehicle system may be a hybrid electric vehicle system including an engine system (e.g., engine system 101), the hybrid electric vehicle system configured to operate in an all-electric mode in some scenarios and in blended or internal combustion engine modes in other scenarios. In other examples, the vehicle system may be an all-electric vehicle system and no engine system may be included therein. In either case, the vehicle system may be coupled to a vehicle controller operable to execute routine 300, such as controller 12.

For example, upon startup of the vehicle system (e.g., 100), the vehicle controller (e.g., 12) may be operable to limit each of a battery discharge power of a battery (e.g., 45) and the wheel torque delivered from an electric machine (e.g., 52) to one or more drive wheels (e.g., 47) based on a battery SOC of the battery and a calibratable minimum threshold vehicle speed. Specifically, the battery SOC may be compared to a threshold SOC to determine whether to limit the wheel torque according to a feedforward torque limit or a maximum torque capability of the battery. The threshold SOC may be a function of each of a battery temperature of the battery and a preset threshold discharge power corresponding to a battery discharge power consumed by the vehicle system while requesting the wheel torque at a maximum torque capability of the vehicle system at the minimum threshold vehicle speed, such that the feedforward torque limit may be selected during vehicle startup scenarios wherein the battery is too cold and/or insufficiently charged to avoid large spikes in delivered wheel torque at vehicle speeds less than the minimum threshold vehicle speed [large spikes which, left unadjusted, may result in the oscillations to the electrified powertrain (e.g., 105)]. Accordingly, in such scenarios, the wheel torque may be commanded at the feedforward torque limit at the vehicle speeds less than the minimum threshold vehicle speed while still allowing the wheel torque to decrease at higher vehicle speeds (e.g., where the wheel torque may be commanded less than the feedforward torque limit). In some examples, the feedforward torque limit may further be adjusted as one or more vehicle operating conditions of the vehicle system change (e.g., as the battery temperature increases). In this way, the oscillations to the electrified powertrain may be dynamically and predictively mitigated by restricting the wheel torque based on torque delivery capabilities of the electrified powertrain at the minimum threshold vehicle speed.

Instructions for carrying out routine 300 may be executed by the vehicle controller (e.g., 12) based on instructions stored on non-transitory memory of the vehicle controller and in conjunction with signals received from various sensors (e.g., 16) and other components of the vehicle system (e.g., 100). Further, the vehicle controller may employ various actuators (e.g., 81) to adjust vehicle operation, e.g., responsive to the battery SOC being less than or equal to the threshold SOC, an electric machine (e.g., 52) may be commanded to deliver torque to the one or more drive wheels (e.g., 47) at less than or equal to the feedforward torque limit throughout vehicle startup and subsequent high-speed operation. As such, routine 300 may enable NVH reduction by actively limiting the wheel torque, thereby avoiding powertrain oscillations associated with spikes in delivered wheel torque and improving drivability and operator satisfaction.

At 302, routine 300 may include receiving a vehicle startup request. For example, an operator of the vehicle system (e.g., 100) may generate the vehicle startup request via actuation of the vehicle system (e.g., by turning a key, depressing a mechanical button, actuating light, movement, and/or weight sensors, etc.) while the vehicle speed is zero. Additionally or alternatively, the vehicle startup request may be received autonomously (e.g., without operator input).

At 304, routine 300 may include estimating and/or measuring one or more vehicle operating conditions. In an exemplary embodiment, the one or more vehicle operating conditions may include one or more of a current operator torque demand (e.g., the wheel torque, in addition to a motor torque and, in hybrid powertrain embodiments, an engine torque), a requested auxiliary load (e.g., an electrical load commanded for auxiliary systems of the vehicle system), a current vehicle speed, electrical and mechanical loss, and a duration between vehicle startup and vehicle propulsion. In additional or alternative embodiments, the one or more vehicle operating conditions may include one or more battery conditions, such as the battery SOC, an instantaneous discharge power limit (e.g., a battery discharge power currently available to the battery), the (current) battery discharge power, the battery temperature, a battery current capacity, etc. In additional or alternative embodiments, the one or more vehicle operating conditions may include one or more ambient conditions of a surrounding environment of the vehicle system, such as an ambient temperature, an ambient humidity, an ambient pressure, an altitude, etc.

In some examples, the one or more vehicle operating conditions may be used by the vehicle controller (e.g., 12) to characterize a current operating state of the vehicle system (e.g., 100). As one example, the vehicle controller may determine or infer that the vehicle startup corresponds to a vehicle cold start responsive to the ambient temperature and/or the battery temperature being less than or equal to a threshold temperature. In an exemplary embodiment, the threshold temperature may be 0° C. In non-limiting examples, the wheel torque may be limited at least responsive to determination of the vehicle cold start.

In some examples, the one or more vehicle operating conditions may be measured by one or more sensors communicatively coupled to the vehicle controller (e.g., 12) or may be inferred based on available data. As one example, the battery temperature may be measured directly via a battery temperature sensor (e.g., 49) or estimated based on the ambient temperature measured via an external temperature sensor, a location of the battery relative to the external temperature sensor, and whether or not auxiliary battery heating is implemented. As another example, the instantaneous discharge power limit may be determined based on feedback received from each of a voltmeter (e.g., 50) and an ammeter (e.g., 51) or retrieved from one or more look-up tables, functions, or maps stored in non-transitory memory of the controller (e.g., 12), the one or more look-up tables, functions, or maps receiving one or more of the battery SOC and the battery temperature as inputs.

As yet another example, one or more look-up tables, functions, or maps stored in non-transitory memory of the controller (e.g., 12) may be utilized to retrieve a threshold SOC, such as at 306, where routine 300 may include determining or inferring the threshold SOC based on one or more of the threshold discharge power and the battery temperature. Specifically, the one or more of the threshold discharge power and the battery temperature may be provided as input(s) to the one or more look-up tables, functions, or maps, which may output the threshold SOC.

In some examples, the battery SOC may serve as a proxy for the battery discharge power weighted as a function of the battery temperature. In such examples, the battery temperature may provide an additional input to the map according to which the threshold SOC may be selected. Additionally or alternatively, the battery temperature may be factored out, and the threshold SOC may be estimated as a function of the threshold discharge power alone. For example, the vehicle system (e.g., 100) may be expected to operate within a limited battery temperature range, such as when the vehicle system operates substantially exclusively in a warmer climate or when a battery heater (e.g., 46) is provided to substantially maintain the battery temperature within the limited battery temperature range.

As described in detail below with reference to FIG. 4, the threshold discharge power may be stored in non-transitory memory of the controller (e.g., 12), and may correspond to a battery discharge power consumed by the vehicle system (e.g., 100) while requesting the wheel torque at a maximum torque capability of the vehicle system at the minimum threshold vehicle speed. In some examples, the threshold SOC may be determined such that the battery SOC may be greater than the threshold SOC when the instantaneous discharge power limit is greater than the threshold discharge power, and the wheel torque may accordingly be requested at the maximum torque capability of the vehicle system at the minimum threshold vehicle speed until available wheel torque drops therebelow. Further, in such examples, the battery SOC may be less than or equal to the threshold SOC when the instantaneous discharge power limit is less than or equal to the threshold discharge power, and the wheel torque may instead be requested at the feedforward torque limit until the minimum threshold vehicle speed is reached (as discussed in detail below). Additionally or alternatively, the threshold battery discharge power may be selected based on an instantaneous discharge power limit above which powertrain oscillations occur below a threshold frequency or below a threshold magnitude (assuming full motor torque is permitted).

At 308, routine 300 may include determining whether the battery SOC is less than or equal to the threshold SOC. If the battery SOC is determined to be greater than the threshold SOC, routine 300 may proceed to 310, where routine 300 may include operating the vehicle system (e.g., 100) while limiting the wheel torque based on the maximum torque capability of the vehicle system. Specifically, and as discussed above, the battery SOC being greater than the threshold SOC may indicate that the instantaneous discharge power limit is higher than the threshold discharge power. As such, and as described in detail below with reference to FIG. 5, the wheel torque available may instead be limited based on the maximum amount of torque which may be provided by the battery (e.g., 45) to the electric machine (e.g., 52) and delivered therefrom to the one or more drive wheels (e.g., 47). Accordingly, no active limit may be imposed on the wheel torque to mitigate powertrain oscillations, as powertrain oscillations may be less likely to occur when the battery has a relatively high instantaneous discharge power limit. Further, in some examples, the battery discharge power consumed by propulsion of the one or more drive wheels (e.g., 47) of the vehicle system (e.g., 100) may also be limited by the maximum amount of torque deliverable by the battery to the electric machine. In this way, responsive to desirable battery conditions, e.g., high battery SOC and/or high battery temperature, the vehicle system may not actively limit torque beyond the torque delivery capabilities of the vehicle system.

If the battery SOC is determined to be less than or equal to the threshold SOC, routine 300 may proceed to 312, where routine 300 may include determining or inferring the feedforward torque limit based on the instantaneous discharge power limit and the minimum threshold vehicle speed. In some examples, the feedforward torque limit may be defined as a ratio of the instantaneous discharge power limit to the minimum threshold vehicle speed. Specifically, since the wheel torque has an inverse relationship with the vehicle speed, large amounts of wheel torque may be available at relatively low vehicle speeds absent implementation of active limits. To avoid large shifts in the wheel torque as the vehicle speed increases, the minimum threshold vehicle speed may be calibrated to a high enough (e.g., non-zero) vehicle speed such that maximum available wheel torque thereat is relatively low when relatively low battery discharge power is available (alternatively, when relatively high battery discharge power is available, such as discussed above in detail above at 310, a maximum torque deliverable by the battery, e.g., 45, may instead limit the commanded wheel torque and thereby avoid large shifts thereof). Accordingly, the feedforward torque limit may correspond to the maximum amount of torque which may be provided by the battery (e.g., limited by the battery SOC) to the electric machine (e.g., 52) and delivered therefrom to the one or more drive wheels (e.g., 47) at the minimum threshold vehicle speed. In this way, the minimum threshold vehicle speed may be selected via feedforward control to set active limits on the commanded wheel torque and thereby mitigate powertrain oscillations resulting from large shifts in the commanded wheel torque at relatively low vehicle speeds.

At 314, routine 300 may include operating the vehicle system (e.g., 100) while limiting the wheel torque based on the feedforward torque limit. Specifically, and as discussed above, the battery SOC being less than or equal to the threshold SOC may indicate that the instantaneous discharge power limit is lower than or equal to the threshold discharge power. Further, in some examples, since the feedforward torque limit may cap available wheel torque, propulsion of the one or more drive wheels (e.g., 47) of the vehicle system may consume a battery discharge power less than the instantaneous discharge power limit at vehicle speeds less than the minimum threshold vehicle speed. In this way, and as described in detail below with reference to FIG. 5, limiting the wheel torque to the feedforward torque limit may result in lower wheel torque delivery than the battery (e.g., 45) may maximally deliver during vehicle startup via active limiting of the discharge battery power to less than the instantaneous discharge power limit at vehicle speeds less than the minimum threshold vehicle speed. In some examples, the feedforward torque limit may still be applied to limit the wheel torque at higher vehicle speeds. However, since the maximum torque deliverable by the battery to the electric machine (e.g., 52) may be lower than the feedforward torque limit at vehicle speeds above the minimum threshold vehicle speed, no active limiting of the wheel torque may occur in practice at such higher vehicle speeds. Rather, the wheel torque may be dynamically limited by the maximum amount of torque which may be provided by the battery (e.g., limited by the battery SOC) to the electric machine and delivered therefrom to the one or more drive wheels (e.g., 47) at the current vehicle speed.

Further, since the instantaneous discharge power limit, the battery SOC, and the battery temperature may be limited by the one or more vehicle operating conditions upon receiving the vehicle startup request, in some examples the minimum threshold vehicle speed may be the only condition dynamically calibratable by the vehicle controller (e.g., 12) in determining the feedforward torque limit (e.g., the feedforward torque limit may be controlled in a feedforward control loop based on the minimum threshold vehicle speed). The maximum torque deliverable by the battery (e.g., 45) to the electric machine (e.g., 52) at vehicle speeds less than the minimum threshold vehicle speed may be higher than the maximum torque deliverable by the battery to the electric machine at vehicle speeds greater than or equal to the minimum threshold vehicle speed, as the maximum torque deliverable by the battery at any given vehicle speed may be defined as the ratio of the instantaneous discharge power limit to the given vehicle speed (such that lower vehicle speeds result in higher maximum torques). In this way, the wheel torque available to the one or more drive wheels (e.g., 47) may be limited based on the feedforward torque limit so as to mitigate powertrain oscillations resulting from large shifts in commanded wheel torque.

Whether the battery discharge power and the wheel torque are limited according to the maximum torque deliverable by the battery (e.g., 45) to the electric machine (e.g., 52) or the feedforward torque limit, routine 300 may proceed to 316, where routine 300 may include determining whether the current vehicle speed has returned to, or has fallen below, the minimum threshold vehicle speed following a post-startup excursion at higher vehicle speeds. If the current vehicle speed has not returned to, or has been maintained above, the minimum threshold vehicle speed, routine 300 may proceed to 318, where routine 300 may include continuing vehicle operation while limiting the battery discharge power and the wheel torque either based on the maximum torque deliverable by the battery or the feedforward torque limit (e.g., according to whether the battery SOC was determined less than or equal to the threshold SOC at 308). Routine 300 may loop back to 316.

If the current vehicle speed has returned to, or has fallen below, the minimum threshold vehicle speed, routine 300 may proceed to 320, where routine 300 may include determining whether a vehicle shutdown request has been received. For example, the operator of the vehicle system (e.g., 100) may generate the vehicle shutdown request via actuation of the vehicle system (e.g., by turning a key, depressing a mechanical button, actuating light, movement, and/or weight sensors, etc.) while the vehicle speed is zero. Additionally or alternatively, the vehicle shutdown request may be received autonomously (e.g., without operator input). If the vehicle shutdown request is not received, routine 300 may return to 304, whereupon routine 300 may again cycle through the feedback control loop. In this way, whenever the current vehicle speed falls below the minimum threshold vehicle speed (e.g., during transient braking and stopping prior to again accelerating to higher vehicle speeds), the threshold SOC may be redetermined and wheel torque limits may be reassessed according to the redetermined threshold SOC.

If the vehicle shutdown request is received, routine 300 may proceed to 322, where routine 300 may include shutting down the vehicle system (e.g., 100). Specifically, active operation of the electrified powertrain (e.g., 105) may cease until another vehicle startup request is received. Accordingly, routine 300 may return. In this way, the wheel torque may be limited by feedforward control throughout an entirety of vehicle operation (e.g., even at higher vehicle speeds and transient excursions back below the minimum threshold vehicle speed), such that the vehicle system may be prevented from commanding wheel torque spikes which may result in oscillations of the electrified powertrain.

Figure 4:
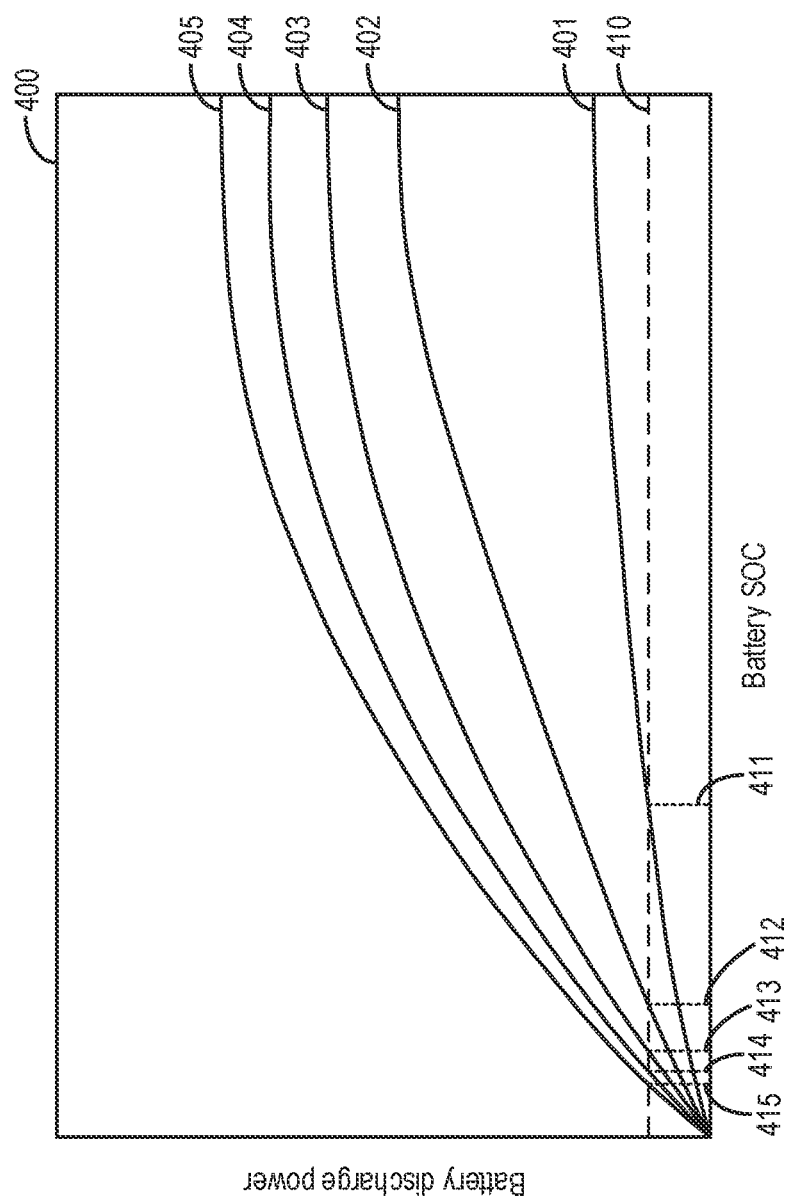
FIG. 4 shows a map for determining a threshold state of charge (SOC) as a function of a battery temperature and a battery discharge power.

Referring now to FIG. 4, a map 400 showing battery SOC as a function of battery discharge power at five exemplary battery temperatures is depicted. In some examples, map 400 may be used by a vehicle controller of a vehicle system (such as controller 12 of vehicle system 100 as described in detail above with reference to FIG. 1) to determine a threshold SOC according to which feedforward control of a wheel torque of the vehicle system may be implemented (e.g., responsive to the battery SOC being less than or equal to the threshold SOC). In such examples, the battery SOC and the battery discharge power may be exemplary values corresponding to a rechargeable vehicle battery or battery pack, such as system battery 45. The five battery temperatures may be relatively low temperatures (e.g., less than or equal to 0° C.) for which battery operation is less than desirable. For example, the rechargeable vehicle battery may have low discharge capabilities at such low temperatures. Accordingly, the threshold SOC may vary based on the battery temperature, as lower battery SOC may correspond to higher battery discharge power at higher battery temperature.

As shown in map 400, an abscissa represents the battery SOC and an ordinate represents the battery discharge power. Each of discharge power curves 401, 402, 403, 404, and 405 respectively correspond to different battery temperatures, the battery temperatures increasing according to this ordering. Specifically, the battery temperature corresponding to discharge power curve 401 may be less than the battery temperature corresponding to discharge power curve 402, the battery temperature corresponding to discharge power curve 402 may be less than the battery temperature corresponding to discharge power curve 403, the battery temperature corresponding to discharge power curve 403 may be less than the battery temperature corresponding to discharge power curve 404, and the battery temperature corresponding to discharge power curve 404 may be less than the battery temperature corresponding to discharge power curve 405.

Further shown is a long dashed line 410 representing a threshold discharge power. Specifically, the threshold discharge power may correspond to a battery discharge power consumed by the vehicle system (e.g., 100) while requesting the wheel torque at a maximum torque capability of the vehicle system at a calibratable minimum threshold vehicle speed. In some examples, the threshold SOC may directly correspond to the threshold discharge power, as feedforward control of the wheel torque may be desirably implemented responsive to relatively low battery discharge power (e.g., less than or equal to the threshold discharge power) being available to the rechargeable vehicle battery (as throttling of such low battery discharge power responsive to large shifts in commanded wheel torque at relatively low vehicle speeds may otherwise generate powertrain oscillations). Thus, the threshold SOC for a given battery temperature may vary based on the discharge capabilities of the rechargeable vehicle battery at the given battery temperature.

Specifically, and as shown, short dashed lines 411, 412, 413, 414, and 415 respectively correspond to a determined threshold SOC for discharge power curves 401, 402, 403, 404, and 405, each of lines 411, 412, 413, 414, and 415 respectively including an intersect of discharge power curves 401, 402, 403, 404, and 405 with line 410 (e.g., respectively corresponding to a battery SOC at which the threshold discharge power is available for a given battery temperature). Since lower battery temperatures may result in lower discharge capabilities, the threshold SOC may increase as the battery temperature decreases. Thus, the threshold SOC corresponding to line 411 may be less than the threshold SOC corresponding to line 412, the threshold SOC corresponding to line 412 may be less than the threshold SOC corresponding to line 413, the threshold SOC corresponding to line 413 may be less than the threshold SOC corresponding to line 414, and the threshold SOC corresponding to line 414 may be less than the threshold SOC corresponding to line 415. In this way, the threshold SOC modulating entry into feedforward control of the wheel torque may be selected based on the battery temperature and the battery discharge power consumed by the vehicle system (e.g., 100) while requesting the wheel torque at the maximum torque capability of the vehicle system at the minimum threshold vehicle speed.

Figure 5:
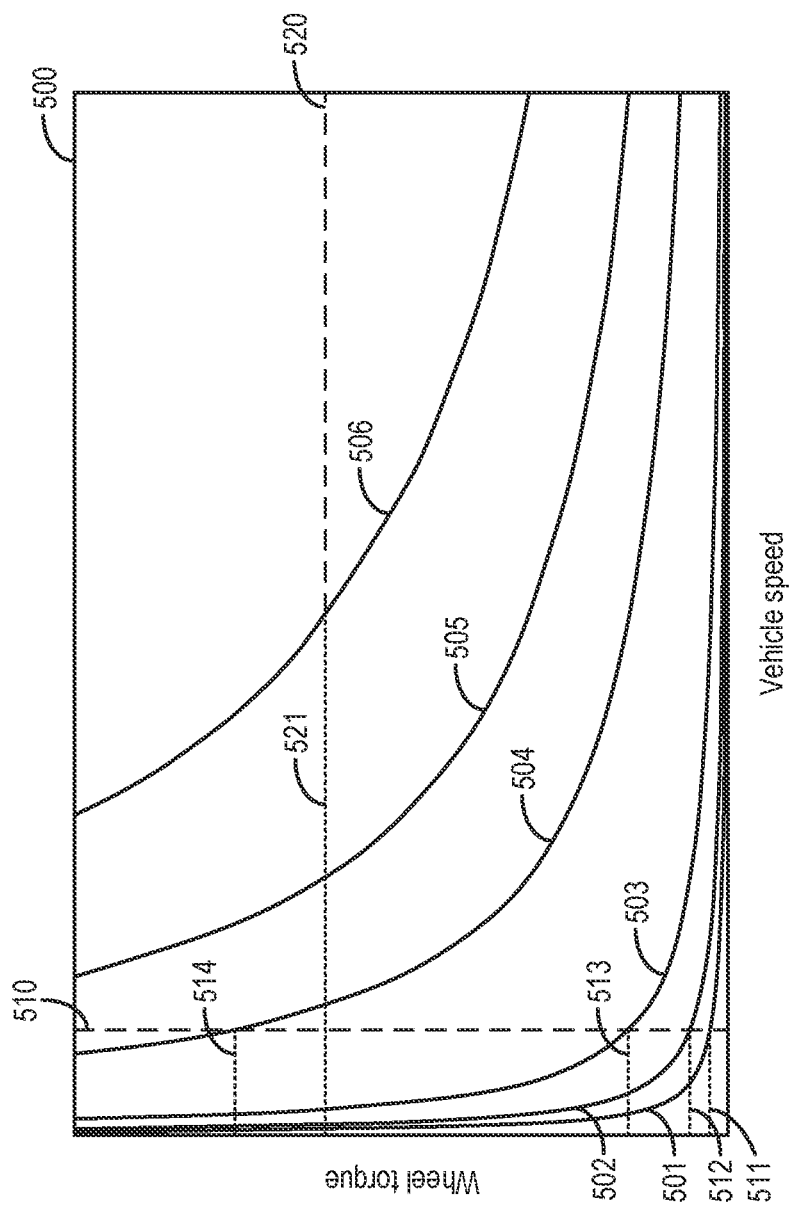
FIG. 5 shows a map for determining a feedforward torque limit as a function of an instantaneous discharge power limit and a minimum threshold vehicle speed.

Referring now to FIG. 5, a map 500 showing feedforward control of wheel torque as a function of exemplary instantaneous discharge power limits at a minimum threshold vehicle speed is depicted. In some examples, map 500 may be used by a vehicle controller of a vehicle system (such as controller 12 of vehicle system 100 as described in detail above with reference to FIG. 1) to determine a limit to a wheel torque of the vehicle system both at lower vehicle speeds during vehicle startup and while maintaining higher vehicle speeds following vehicle startup. In such examples, the instantaneous discharge power limits may be exemplary values corresponding to a rechargeable vehicle battery or battery pack, such as system battery 45. In some examples, if a given instantaneous discharge power limit at the minimum threshold vehicle speed is determined to be less than or equal to a threshold discharge power corresponding to a battery discharge power consumed by the vehicle system (e.g., 100) while requesting the wheel torque at a maximum torque capability of the vehicle system at the minimum threshold vehicle speed, then the wheel torque delivered to one or more drive wheels (e.g., 47) may be limited based on the given instantaneous discharge power limit instead of the threshold discharge power.

As shown in map 500, an abscissa represents the vehicle speed and an ordinate represents the wheel torque. Each of torque curves 501, 502, 503, 504, 505, and 506 respectively correspond to different instantaneous discharge power limits, the instantaneous discharge power limits increasing according to this ordering. Specifically, the instantaneous discharge power limit corresponding to torque curve 501 may be less than the instantaneous discharge power limit corresponding to torque curve 502, the instantaneous discharge power limit corresponding to torque curve 502 may be less than the instantaneous discharge power limit corresponding to torque curve 503, the instantaneous discharge power limit corresponding to torque curve 503 may be less than the instantaneous discharge power limit corresponding to torque curve 504, the instantaneous discharge power limit corresponding to torque curve 504 may be less than the instantaneous discharge power limit corresponding to torque curve 505, and the instantaneous discharge power limit corresponding to torque curve 505 may be less than the instantaneous discharge power limit corresponding to torque curve 506.

Further shown is a long dashed line 510 representing the minimum threshold vehicle speed and a long dashed line 520 representing the maximum torque capability of the vehicle system (e.g., 100). Specifically, the minimum threshold vehicle speed may be a non-zero vehicle speed selected such that limiting the wheel torque deliverable to the one or more drive wheels (e.g., 47) to less than or equal to a wheel torque at an intersect of the minimum threshold vehicle speed with a corresponding torque curve mitigates oscillations of an electrified powertrain (e.g., 105) for relatively low instantaneous discharge power limits. However, at relatively high instantaneous discharge power limits, the maximum torque capability of the vehicle system may be lower at the minimum threshold vehicle speed than the wheel torque at an intersect of the minimum threshold vehicle speed with a corresponding torque curve.

Specifically, and as shown, short dashed lines 511, 512, 513, and 514 respectively correspond to a determined feedforward torque limit for torque curves 501, 502, 503, and 504, each of lines 511, 512, 513, and 514 respectively including an intersect of torque curves 501, 502, 503, and 504 with line 510 (e.g., respectively corresponding to the wheel torque available at the minimum threshold vehicle speed for a given instantaneous discharge power limit). Since higher instantaneous discharge power limits may result in higher deliverable wheel torque, the feedforward torque limit may increase as the instantaneous discharge power limit increases. Thus, the feedforward torque limit corresponding to line 511 may be less than the feedforward torque limit corresponding to line 512, the feedforward torque limit corresponding to line 512 may be less than the feedforward torque limit corresponding to line 513, and the feedforward torque limit corresponding to line 513 may be less than the feedforward torque limit corresponding to line 514.

For instantaneous discharge power limits less than or equal to the maximum torque capability (line 520), responsive to the vehicle speed being less than or equal to the minimum threshold vehicle speed (line 510), the vehicle system (e.g., 100) may be operated while requesting the wheel torque at the feedforward torque limit (e.g., along lines 511, 512, and 513), and responsive to the vehicle speed being greater than the minimum threshold vehicle speed, the vehicle system may be operated while requesting the wheel torque at less than the feedforward torque limit (e.g., along torque curves 501, 502, and 503 respectively for the feedforward torque limits corresponding to lines 511, 512, and 513). However, for instantaneous discharge power limits greater than the maximum torque capability, responsive to commanded wheel torque being less than or equal to the maximum torque capability (e.g., inclusive of vehicle operation at vehicle speeds less than or equal to the minimum threshold vehicle speed), the vehicle system may be operated while requesting the wheel torque at the maximum torque capability (e.g., along short dashed line 521, which overlaps with line 520), and responsive to the commanded wheel torque being greater than the maximum torque capability, the vehicle system may be operated while requesting the wheel torque at less than the maximum torque capability (e.g., along torque curve 504, 505, or 506). In this way, feedforward control may be implemented for limiting the wheel torque when relatively low battery discharge power is currently available to the rechargeable vehicle battery.

Referring now to FIG. 6, a timeline 600 depicting an example operation of limiting a wheel torque of a vehicle based on a maximum torque deliverable by a vehicle battery upon startup of the vehicle is shown. For example, the example operation may correspond to an electrified powertrain including a vehicle battery (such as electrified powertrain 105 and system battery 45 of vehicle system 100 as described above with reference to FIG. 1), a battery SOC of the vehicle battery remaining relatively low throughout the example operation. Specifically, the battery SOC may remain less than a threshold SOC, the threshold SOC corresponding to a battery discharge power consumed by the vehicle while requesting the wheel torque at a maximum torque capability of the vehicle at a minimum threshold vehicle speed. The battery discharge power being correspondingly low, oscillations of the electrified powertrain may evolve as a result of unmitigated upward and downward shifts in commanded wheel torque present at low battery discharge power. Accordingly, the example operation may be considered an exemplary embodiment of the vehicle system under select conditions wherein feedforward control of the commanded wheel torque has not yet been implemented or calibrated, or is malfunctioning.

Timeline 600 depicts an accelerator pedal position at solid curve 601, a vehicle acceleration at solid curve 611, a vehicle speed at solid curve 621, the wheel torque at solid curve 631, the battery SOC at solid curve 641, the battery discharge power at solid curve 651, and a battery temperature at solid curve 661. Additionally, dashed curve 622 represents the minimum threshold vehicle speed, dashed curve 632 represents the maximum wheel torque deliverable by the vehicle battery upon startup of the vehicle, dashed curve 642 represents the threshold SOC corresponding to the battery discharge power consumed by the vehicle while requesting the wheel torque at the maximum torque capability of the vehicle at the minimum threshold vehicle speed, and dashed curve 652 represents an instantaneous discharge power limit of the vehicle battery. All curves are depicted over time and plotted along an abscissa, where time increases from left to right of the abscissa. Further, a dependent variable represented by each curve discussed above is plotted along a corresponding ordinate, where the dependent variable increases from bottom to top of the given ordinate (unless otherwise stated or shown).

Prior to t1, the vehicle may be shut down and the electrified powertrain therein may not be delivering wheel torque to drive wheels of the vehicle. At t1, a vehicle startup request may be received at the vehicle, e.g., autonomously or provided by an operator thereof, and therewith the operator may actuate the accelerator pedal (curve 601), e.g., by depressing the accelerator pedal from a default position at zero vehicle acceleration. Upon actuation of the accelerator pedal, the vehicle acceleration (curve 611) and the vehicle speed (curve 621) may increase responsive to actuation of the electrified powertrain.

Specifically, at t1, the vehicle battery may begin delivering power to an electric machine of the electrified powertrain, e.g., the battery SOC (curve 641) may begin decreasing and the battery discharge power (curve 651) may begin increasing. The electric machine may thereby generate torque deliverable to the one or more drive wheels (curve 631). Throughout vehicle startup, the battery temperature (curve 661) may remain relatively cold (e.g., less than 0° C., as shown, though higher battery temperatures may result in similar vehicle operation), further limiting the battery discharge power. Further, the battery SOC may remain less than the threshold SOC (curve 642) and the battery discharge power may remain less than the instantaneous discharge power limit (curve 652) throughout vehicle operation.

As shown, following t1, the wheel torque (curve 631) may rapidly increase to the maximum wheel torque deliverable at vehicle startup (curve 632), resulting in oscillations in the electrified powertrain (e.g., such as oscillations 656 in the battery discharge power). Such oscillations may affect drivability of the vehicle, and may be experienced by the operator as NVH issues manifested at least as oscillations 616 and 626 in the vehicle acceleration and the vehicle speed, respectively.

At t2, as the vehicle speed (curve 621) increases, the wheel torque (curve 631) may begin rapidly decreasing below the maximum wheel torque deliverable at vehicle startup (curve 632). Between t2 and t3, as the vehicle speed continues increasing [e.g., above the minimum threshold vehicle speed (curve 622)], the rapid decrease in the wheel torque may transition to a more gradual decreasing trend and the oscillations 616, 626, and 656 may dissipate.

After t3, the vehicle may operate according to typical post-startup operation. At a later point in time, the vehicle may shut down responsive to receipt of a vehicle shutdown request (e.g., autonomously or from the operator).

Referring now to FIG. 7, a timeline 700 depicting an example operation of limiting a wheel torque in a vehicle based on a feedforward control loop is shown. For example, the example operation may correspond to an electrified powertrain including a vehicle battery (such as electrified powertrain 105 and system battery 45 of vehicle system 100 as described above with reference to FIG. 1), a battery SOC of the vehicle battery remaining relatively low throughout the example operation. Specifically, the battery SOC may remain less than a threshold SOC, the threshold SOC corresponding to a battery discharge power consumed by the vehicle while requesting the wheel torque at a maximum torque capability of the vehicle at a minimum threshold vehicle speed. The battery discharge power being correspondingly low, the wheel torque delivered by the electrified powertrain may be actively lowered at vehicle speeds less than the minimum threshold vehicle speed such that oscillations of the electrified powertrain resulting from unmitigated upward and downward shifts in commanded wheel torque present at low battery discharge power may be substantially eliminated. In an exemplary embodiment, the delivered wheel torque may be limited according to a feedforward control loop receiving a minimum threshold vehicle speed as input, where the wheel torque available at the minimum threshold vehicle speed may be employed to cap the deliverable wheel torque throughout vehicle operation.

In some examples, the threshold SOC may be dynamically adjusted during vehicle operation (e.g., during transient low vehicle speed excursions) such that wheel torque delivery may be maximized while mitigating powertrain oscillations. For example, as a battery temperature of the vehicle battery increases, the vehicle battery may be capable of handling larger shifts in the commanded wheel torque at lower battery discharge power without inducing powertrain oscillations. In such an example, when the vehicle speed again decreases to the minimum threshold vehicle speed after the vehicle has operated at higher vehicle speeds (e.g., typical post-startup operation), the threshold SOC may be lowered to account for such increased capability at the vehicle battery. Accordingly, the wheel torque may be limited according to the feedforward control loop under more restrictive conditions (e.g., in a reduced battery SOC regime).

Timeline 700 depicts an accelerator pedal position at solid curve 701, a vehicle acceleration at solid curve 711, a vehicle speed at solid curve 721, the wheel torque at solid curve 731, the battery SOC at solid curve 741, the battery discharge power at solid curve 751, and the battery temperature at solid curve 761. Additionally, long dashed curve 722 represents the minimum threshold vehicle speed, long dashed curve 732 represents the maximum wheel torque deliverable by the vehicle battery upon startup of the vehicle, long dashed curve 733 represents the feedforward torque limit, short dashed curves 736 and 737 represent hypothetical wheel torques available were the feedforward torque limit not implemented, long dashed curve 742 represents the threshold SOC corresponding to the battery discharge power consumed by the vehicle while requesting the wheel torque at the maximum torque capability of the vehicle at the minimum threshold vehicle speed, short dashed curve 747 represents a hypothetical battery SOC above the threshold SOC following dynamic adjustment thereto, and long dashed curve 752 represents an instantaneous discharge power limit of the vehicle battery. All curves are depicted over time and plotted along an abscissa, where time increases from left to right of the abscissa. Further, a dependent variable represented by each curve discussed above is plotted along a corresponding ordinate, where the dependent variable increases from bottom to top of the given ordinate (unless otherwise stated or shown).

Prior to t4, the vehicle may be shut down and the electrified powertrain therein may not be delivering wheel torque to drive wheels of the vehicle. At t4, a vehicle startup request may be received at the vehicle, e.g., autonomously provided by an operator thereof, and therewith the operator may actuate the accelerator pedal (curve 701), e.g., by depressing the accelerator pedal from a default position at zero vehicle acceleration. Upon actuation of the accelerator pedal, the vehicle acceleration (curve 711) and the vehicle speed (curve 721) may increase responsive to actuation of the electrified powertrain.

Specifically, at t4, the vehicle battery may begin delivering power to an electric machine of the electrified powertrain, e.g., the battery SOC (curve 741) may begin decreasing and the battery discharge power (curve 751) may begin increasing. The electric machine may thereby generate torque deliverable to the one or more drive wheels (curve 731). Throughout vehicle startup, the battery temperature (curve 761) may remain relatively cold (e.g., less than 0° C., as shown, though feedforward torque control may higher battery temperatures may result in similar vehicle operation), further limiting the battery discharge power. Further, the battery SOC may remain less than the threshold SOC (curve 742) and the battery discharge power may remain less than the instantaneous discharge power limit (curve 752) throughout vehicle operation.

As shown, following t4, the wheel torque (curve 731) may rapidly increase towards the maximum wheel torque deliverable at vehicle startup (curve 732). However, because the feedforward torque limit (curve 733) has been applied to actively limit the wheel torque, the wheel torque may cease increasing and initially remain less than the hypothetical wheel torque available (curve 736). As a result, oscillations of the electrified powertrain may be avoided which may otherwise result (e.g., if the full, hypothetical wheel torque was commanded).

At t5, as the vehicle speed (curve 721) increases past the minimum threshold vehicle speed (curve 722), the wheel torque (curve 731) may begin rapidly decreasing below the feedforward torque limit (curve 733) defined based on the available wheel torque at the minimum threshold vehicle speed. Accordingly, in the depicted example, the wheel torque may only be commanded at the feedforward torque limit when the vehicle speed is less than or equal to the minimum threshold vehicle speed and the battery SOC (curve 741) is less than the threshold SOC (curve 742) (e.g., between t4 and t5). Further, when the vehicle speed is higher than the minimum threshold vehicle speed (e.g., at t5 and for a duration of typical vehicle operation thereafter), the wheel torque may be commanded less than the feedforward torque limit. Limiting the wheel torque in this way may avoid the rapid increase and decrease which would otherwise result between t4 and t5 if the hypothetical wheel torque available (curve 736) was commanded while the battery SOC was less than the threshold SOC. Thereafter (e.g., between t5 and t6), the wheel torque may gradually decrease.

After t6, the vehicle may operate according to typical post-startup operation. Between t6 and t7, an extended time interval is indicated by a break in the abscissa during which the vehicle may be used consistently at a vehicle speed higher than the minimum threshold vehicle speed.

Immediately prior to t7, the vehicle may begin coasting, such that the vehicle speed and the wheel torque may begin decreasing. Coasting continues between t7 and t8, where the vehicle speed (curve 721) continues decreasing and the vehicle acceleration and the wheel torque remain negative (not shown). In some examples, regenerative braking during coasting may redirect the negative wheel torque to drive the electric machine such that the electric machine may be operated as a generator and charge the vehicle battery [as shown, the battery SOC (curve 741) may increase following t7 and may continue increasing until positive wheel torque is again applied at t9].

At t8, the vehicle speed (curve 721) may reach the minimum threshold vehicle speed (curve 722). Accordingly, the threshold SOC (curve 742) may be redetermined, accounting for changes in one or more vehicle operating conditions. For example, the battery temperature (curve 761) may have increased between vehicle startup at t4 and the vehicle speed returning to the minimum threshold vehicle speed at t8. At higher battery temperatures, the vehicle battery may be capable of handling larger shifts in the wheel torque without generating severe powertrain oscillations. The threshold SOC may therefore be lowered such that greater wheel torque may be requested if the battery SOC increases thereabove [(e.g., above the feedforward torque limit (curve 733)].

As shown, the battery SOC (curve 741) may remain less than the threshold SOC (curve 741) upon lowering of thereof at t8, and thus feedforward control of the wheel torque (curve 731) may be maintained. Accordingly, when the accelerator pedal (curve 701) is again actuated at t9, the vehicle battery may begin delivering power to the electric machine, e.g., the battery SOC (curve 741) may begin decreasing and the battery discharge power (curve 751) may begin increasing. The electric machine may generate torque deliverable to the one or more drive wheels (curve 731). The vehicle acceleration (curve 711) may thereby increase responsive to actuation of the electrified powertrain, such that the vehicle speed (curve 721) ceases falling and again rises following t9.

As shown, following t9, the wheel torque may rapidly increase towards the maximum wheel torque deliverable at vehicle startup (curve 732). However, because the feedforward torque limit (curve 733) has been maintained to actively limit the wheel torque, the wheel torque may cease increasing and remain less than the hypothetical wheel torque available (curve 737) until the vehicle speed (curve 721) again increases above the minimum threshold vehicle speed. As a result, oscillations of the electrified powertrain may be avoided which may otherwise result (e.g., if the full, hypothetical wheel torque was commanded).

However, if the battery SOC were instead above the threshold SOC (curve 742) at least following lowering thereof (as shown by curve 747), feedforward control of the wheel torque would cease and the wheel torque would increase according to the hypothetical wheel torque available (curve 737). In this way, the vehicle may be operated with the wheel torque at the maximum wheel torque available at relatively low vehicle speeds (e.g., up to curve 732), even when feedforward control of the wheel torque has been previously applied during a same vehicle operation (e.g., with no intervening vehicle shutdown).

At t10, as the vehicle speed (curve 721) increases past the minimum threshold vehicle speed (curve 722), the wheel torque (curve 731) may begin rapidly decreasing below the feedforward torque limit (curve 733). Accordingly, in the depicted example, the wheel torque may only be commanded at the feedforward torque limit when the vehicle speed is less than or equal to the minimum threshold vehicle speed and the battery SOC (curve 741) is less than the threshold SOC (curve 742) (e.g., between t9 and t10). Further, when the vehicle speed is higher than the minimum threshold vehicle speed (e.g., at t10 and for a duration of typical vehicle operation thereafter), the wheel torque may be commanded less than the feedforward torque limit. Limiting the wheel torque in this way may avoid the rapid increase and decrease which would otherwise result between t9 and t10 if the hypothetical wheel torque available (curve 737) was commanded while the battery SOC was less than the threshold SOC. Thereafter (e.g., between t10 and t11), the wheel torque may gradually decrease.

After t11, the vehicle may operate according to typical post-startup operation. At a later point in time, the vehicle may shut down responsive to receipt of a vehicle shutdown request (e.g., autonomously or from the operator).

In this way, systems and methods are provided for mitigating oscillations at an electrified powertrain of a vehicle. In one example, a wheel torque requested for vehicle propulsion may be dynamically limited via a feedforward control loop. The feedforward control loop may receive as inputs an instantaneous discharge power limit of a vehicle battery and a minimum threshold vehicle speed, from which a feedforward torque limit for the wheel torque may be determined. In some examples, determination of the feedforward torque limit may be responsive to a state of charge (SOC) of the vehicle battery being less than or equal to a threshold SOC. The threshold SOC may be estimated based on a temperature of the vehicle battery and a battery discharge power consumed by the vehicle while requesting the wheel torque at a maximum torque capability of the vehicle at the minimum threshold vehicle speed. As such, the requested wheel torque may be reduced during a vehicle cold start wherein the vehicle battery has a relatively low SOC and/or the vehicle battery is subjected to relatively low temperatures.

In some examples, the feedforward torque limit may be retained throughout vehicle operation, e.g., both at higher vehicle speeds and during subsequent excursions below the minimum threshold vehicle speed. In one example, whenever the vehicle speed decreases to the minimum threshold vehicle speed from a higher vehicle speed, the feedforward torque limit may be dynamically updated responsive to one or more vehicle operating conditions continuing to be satisfied (e.g., low discharge power, low SOC, low battery temperature, etc.). A technical effect of commanding reductions in wheel torque when the one or more vehicle operating conditions are satisfied at relatively low vehicle speeds is that oscillations of the electrified powertrain may be dynamically and predictively mitigated across various power levels of the vehicle battery.

In one example, a method for operating a vehicle during startup, the method comprising: responsive to the discharge power currently available to a battery pack of the vehicle being less than or equal to a threshold discharge power and further responsive to a current vehicle speed being less than or equal to a threshold vehicle speed, operating the vehicle while requesting a wheel torque at a feedforward torque limit, the feedforward torque limit being based on the threshold vehicle speed and the discharge power currently available to the battery pack. A first example of the method further comprises, responsive to the current vehicle speed being greater than the threshold vehicle speed, operating the vehicle while requesting the wheel torque at less than the feedforward torque limit. A second example of the method, optionally including the first example of the method, further includes wherein the threshold discharge power corresponds to a discharge power consumed by the vehicle while requesting the wheel torque at a maximum torque capability of the vehicle at the threshold vehicle speed. A third example of the method, optionally including one or more of the first and second examples of the method, further comprises, responsive to the discharge power currently available to the battery pack being greater than the threshold discharge power and the current vehicle speed being less than or equal to the threshold vehicle speed, operating the vehicle while requesting the wheel torque at the maximum torque capability of the vehicle. A fourth example of the method, optionally including one or more of the first through third examples of the method, further comprises, responsive to the discharge power currently available to the battery pack being less than or equal to the threshold discharge power and further responsive to the current vehicle speed being less than the threshold vehicle speed, operating the vehicle such that propulsion of one or more drive wheels of the vehicle consumes a discharge power from the battery pack at less than the discharge power currently available to the battery pack. A fifth example of the method, optionally including one or more of the first through fifth examples of the method, further includes wherein the vehicle is operated while requesting the wheel torque at the feedforward torque limit only during conditions where the current vehicle speed is less than or equal to the threshold vehicle speed. A sixth example of the method, optionally including one or more of the first through fifth examples of the method, further includes wherein the vehicle is an all-electric vehicle. A seventh example of the method, optionally including one or more of the first through sixth examples of the method, further includes wherein the vehicle is a hybrid electric vehicle operating in an all-electric mode during startup.

In another example, a vehicle system, comprising: a plurality of drive wheels; an electric motor configured to deliver torque to the plurality of drive wheels; a battery configured to provide power to the electric motor; and a controller configured to carry out instructions executable to, during a first startup condition initiated responsive to a state of charge (SOC) of the battery being less than or equal to a threshold SOC, request a first amount of torque from the electric motor, the first amount of torque being based on a ratio of a discharge power of the battery to a minimum threshold vehicle speed. A first example of the vehicle system further includes wherein the first amount of torque is requested from the electric motor responsive to a current vehicle speed being less than or equal to the minimum threshold vehicle speed. A second example of the vehicle system, optionally including the first example of the vehicle system, further includes wherein the instructions are further executable to, during the first startup condition, limit an amount of torque deliverable to the plurality of drive wheels to less than or equal to a threshold amount of torque, the threshold amount of torque being based on a ratio of an instantaneous discharge power limit of the battery to the minimum threshold vehicle speed. A third example of the vehicle system, optionally including one or more of the first and second examples of the vehicle system, further includes wherein the threshold amount of torque is controlled in a feedforward control loop based on the minimum threshold vehicle speed. A fourth example of the vehicle system, optionally including one or more of the first through third examples of the vehicle system, further includes wherein the plurality of drive wheels, the electric motor, and the battery are included in a powertrain of the vehicle system, the minimum threshold vehicle speed being selected such that limiting the amount of torque deliverable to the plurality of drive wheels to less than or equal to the threshold amount of torque mitigates oscillations of the powertrain during the first startup condition. A fifth example of the vehicle system, optionally including one or more of the first through fourth examples of the vehicle system, further comprises a voltmeter configured to generate feedback indicative of a potential difference across the battery; and an ammeter configured to generate feedback indicative of a current of the battery, wherein the controller is communicably coupled to the voltmeter and the ammeter, and wherein the instructions are further executable to, during the first startup condition: receive the feedback from each of the voltmeter and the ammeter; and estimate the instantaneous discharge power limit based on the received feedback. A sixth example of the vehicle system, optionally including one or more of the first through fifth examples of the vehicle system, further includes wherein the instructions are further executable to, during the first startup condition, retrieve the instantaneous discharge power limit from one or more look-up tables, functions, or maps stored in non-transitory memory of the controller, the one or more look-up tables, functions, or maps receiving one or more of the SOC and a temperature of the battery as inputs. A seventh example of the vehicle system, optionally including one or more of the first through sixth examples of the vehicle system, further includes wherein the instructions are further executable to retrieve the threshold SOC from one or more look-up tables, functions, or maps stored in non-transitory memory of the controller, the one or more look-up tables, functions, or maps receiving a discharge power of the battery consumed by the vehicle system while requesting a maximum amount of torque deliverable to the plurality of drive wheels at the minimum threshold vehicle speed as an input. An eighth example of the vehicle system, optionally including one or more of the first through seventh examples of the vehicle system, further includes wherein the instructions are further executable to, during a second startup condition initiated responsive to the SOC being greater than the threshold SOC, request a second amount of torque from the electric motor, the second amount of torque being based on a maximum amount of torque deliverable by the electric motor. A ninth example of the vehicle system, optionally including one or more of the first through eighth examples of the vehicle system, further includes wherein the instructions are further executable to, during a post-startup condition initiated responsive to a current vehicle speed being greater than the minimum threshold vehicle speed, dynamically request a third amount of torque from the electric motor, the third amount of torque being based on a ratio of the discharge power to the current vehicle speed.

In yet another example, a method for a vehicle cold start, the method comprising: receiving a vehicle startup request corresponding to the vehicle cold start responsive to a temperature of a rechargeable battery pack upon receiving the vehicle startup request being less than or equal to a threshold temperature; responsive to the vehicle startup request and a state of charge (SOC) of the rechargeable battery pack being less than or equal to a threshold SOC, limiting a drive wheel torque based on a ratio of a discharge power limit to a minimum threshold vehicle speed; and responsive to the SOC being greater than the threshold SOC, limiting the drive wheel torque based on a maximum torque capability of the rechargeable battery pack. A first example of the method further includes wherein the threshold SOC is based on the temperature of the rechargeable battery pack upon receiving the vehicle startup request.

In another representation, a method for a vehicle, the method comprising: commanding a wheel torque at less than a maximum wheel torque availability of the vehicle in response to each of a discharge power being less than a threshold discharge power and a vehicle speed being less than a threshold vehicle speed; and commanding the wheel torque at the maximum wheel torque availability in response to the vehicle speed being greater than or equal to the threshold vehicle speed.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle during startup, the method comprising:
   responsive to a discharge power currently available to a battery pack of the vehicle being less than or equal to a threshold discharge power and further responsive to a current vehicle speed being less than or equal to a threshold vehicle speed and wherein the vehicle is an all-electric vehicle or a hybrid electric vehicle operating in an all-electric mode during startup, operating the vehicle while requesting a wheel torque at a feedforward torque limit, the feedforward torque limit being based on the threshold vehicle speed and the discharge power currently available to the battery pack.

2. The method of claim 1, further comprising, responsive to the current vehicle speed being greater than the threshold vehicle speed, operating the vehicle while requesting the wheel torque at less than the feedforward torque limit.

3. The method of claim 1, wherein the threshold discharge power corresponds to a discharge power consumed by the vehicle while requesting the wheel torque at a maximum torque capability of the vehicle at the threshold vehicle speed.

4. The method of claim 3, further comprising, responsive to the discharge power currently available to the battery pack being greater than the threshold discharge power and the current vehicle speed being less than or equal to the threshold vehicle speed, operating the vehicle while requesting the wheel torque at the maximum torque capability of the vehicle.

5. The method of claim 1, further comprising, responsive to the discharge power currently available to the battery pack being less than or equal to the threshold discharge power and further responsive to the current vehicle speed being less than the threshold vehicle speed, operating the vehicle such that propulsion of one or more drive wheels of the vehicle consumes a discharge power from the battery pack at less than the discharge power currently available to the battery pack.

6. The method of claim 1, wherein the vehicle is operated while requesting the wheel torque at the feedforward torque limit only during conditions where the current vehicle speed is less than or equal to the threshold vehicle speed.

7. A vehicle system, comprising:
   a plurality of drive wheels;
   an electric motor configured to deliver torque to the plurality of drive wheels;
   a battery configured to provide power to the electric motor; and
   a controller configured to carry out instructions executable to, during a first startup condition system initiated responsive to a state of charge (SOC) of the battery being less than or equal to a threshold SOC, request a first amount of torque from the electric motor, the first amount of torque being based on a ratio of a discharge power of the battery to a minimum threshold vehicle speed, and during the first startup condition, limit an amount of torque deliverable to the plurality of drive wheels to less than or equal to a threshold amount of torque, the threshold amount of torque being based on a ratio of an instantaneous discharge power limit of the battery to the minimum threshold vehicle speed.

8. The vehicle system of claim 7, wherein the instructions are further executable to, during the first startup condition, limit an amount of torque deliverable to the plurality of drive wheels to less than or equal to a threshold amount of torque, the threshold amount of torque being based on a ratio of an instantaneous discharge power limit of the battery to the minimum threshold vehicle speed.

9. The vehicle system of claim 8, wherein the threshold amount of torque is controlled in a feedforward control loop based on the minimum threshold vehicle speed.

10. The vehicle system of claim 8, wherein the plurality of drive wheels, the electric motor, and the battery are included in a powertrain of the vehicle system, the minimum threshold vehicle speed being selected such that limiting the amount of torque deliverable to the plurality of drive wheels to less than or equal to the threshold amount of torque mitigates oscillations of the powertrain during the first startup condition.

11. The vehicle system of claim 8, further comprising:
   a voltmeter configured to generate feedback indicative of a potential difference across the battery; and
   an ammeter configured to generate feedback indicative of a current of the battery,
   wherein the controller is communicably coupled to the voltmeter and the ammeter, and
   wherein the instructions are further executable to, during the first startup condition:
      receive the feedback from each of the voltmeter and the ammeter; and
      estimate the instantaneous discharge power limit based on the received feedback.

12. The vehicle system of claim 8, wherein the instructions are further executable to, during the first startup condition, retrieve the instantaneous discharge power limit from one or more look-up tables, functions, or maps stored in non-transitory memory of the controller, the one or more look-up tables, functions, or maps receiving one or more of the SOC and a temperature of the battery as inputs.

13. The vehicle system of claim 7, wherein the instructions are further executable to retrieve the threshold SOC from one or more look-up tables, functions, or maps stored in non-transitory memory of the controller, the one or more look-up tables, functions, or maps receiving a discharge power of the battery consumed by the vehicle system while requesting a maximum amount of torque deliverable to the plurality of drive wheels at the minimum threshold vehicle speed as an input.

14. The vehicle system of claim 7, wherein the instructions are further executable to, during a post-startup condition initiated responsive to a current vehicle speed being greater than the minimum threshold vehicle speed, dynamically request a third amount of torque from the electric motor, the third amount of torque being based on a ratio of the discharge power to the current vehicle speed.

15. A method for operating a vehicle during startup, the method comprising:

responsive to a discharge power currently available to a battery pack of the vehicle being less than or equal to a threshold discharge power and further responsive to a current vehicle speed being less than or equal to a threshold vehicle speed, operating the vehicle while requesting a wheel torque at a feedforward torque limit, the feedforward torque limit being based on the threshold vehicle speed and the discharge power currently available to the battery pack; and responsive to the current vehicle speed being greater than the threshold vehicle speed, operating the vehicle while requesting the wheel torque at less than the feedforward torque limit.

* * * * *